(12) United States Patent
Ohno

(10) Patent No.: US 8,724,161 B2
(45) Date of Patent: May 13, 2014

(54) METHOD, APPARATUS, AND COMPUTER PROGRAM PRODUCT FOR PROCESSING IMAGE DATA OF PLURAL IMAGES TO COMBINE FOR OUTPUT TO A RECORDING MEDIUM

(75) Inventor: Satoru Ohno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1206 days.

(21) Appl. No.: 11/873,615

(22) Filed: Oct. 17, 2007

(65) Prior Publication Data

US 2008/0106769 A1 May 8, 2008

(30) Foreign Application Priority Data

Nov. 6, 2006 (JP) ................................ 2006-300315

(51) Int. Cl.
*G06F 15/00* (2006.01)
*G06K 15/00* (2006.01)

(52) U.S. Cl.
USPC .......................................... 358/1.2; 358/1.18

(58) Field of Classification Search
USPC ........... 711/170–173; 399/83; 358/1.15–1.18, 358/1.2, 3.23
See application file for complete search history.

(56) References Cited

U.S. PATENT DOCUMENTS

| | | | | |
|---|---|---|---|---|
| 6,208,429 B1 * | 3/2001 | Anderson | ..................... | 358/1.18 |
| 6,480,295 B1 * | 11/2002 | Taoda | ........................... | 358/1.16 |
| 6,546,215 B2 * | 4/2003 | Machida | ........................ | 399/82 |
| 7,612,908 B2 * | 11/2009 | Asai | ............................... | 358/1.2 |
| 7,916,340 B2 * | 3/2011 | Sasaki | ............................. | 358/1.2 |
| 2004/0212825 A1 * | 10/2004 | Sai et al. | ..................... | 358/1.15 |
| 2007/0041051 A1 * | 2/2007 | Tanaka | ......................... | 358/1.18 |

FOREIGN PATENT DOCUMENTS

| | | |
|---|---|---|
| JP | 2001-30564 | 2/2001 |
| JP | 2003-341156 | 12/2003 |
| JP | 2004-104447 | 4/2004 |
| JP | 2005-79646 | 3/2005 |

* cited by examiner

*Primary Examiner* — Barbara Reinier
(74) *Attorney, Agent, or Firm* — Cooper & Dunham LLP

(57) ABSTRACT

An input processor performs an input processing of image data. A memory unit has a work area for combining the image data. A writing unit sequentially writes the image data on which the input processing is performed in the work area of the memory unit. A determining unit determines, when the image data are combined, whether image data to be arranged in a direction orthogonal to an image output direction are written in the work area. An output processor performs, when it is determined that the image data are written in the work area, an output processing of the image data to be arranged in the direction orthogonal to the image output direction.

18 Claims, 19 Drawing Sheets

| LAYOUT PATTERN | ROTATION | RESERVED SIZE | START TIMING |
|---|---|---|---|
| PATTERN A | NOT ROTATED | 1/2 | WHEN 1/2 IS READY |
| | 90° | 3/4 | WHEN 3/4 IS READY |
| | 180° | 4/4 | WHEN 4/4 IS READY |
| | 270° | 4/4 | WHEN 4/4 IS READY |
| PATTERN B | NOT ROTATED | 1/2 | WHEN 1/2 IS READY |
| | 90° | 4/4 | WHEN 4/4 IS READY |
| | 180° | 4/4 | WHEN 4/4 IS READY |
| | 270° | 3/4 | WHEN 3/4 IS READY |
| PATTERN C | NOT ROTATED | 3/4 | WHEN 3/4 IS READY |
| | 90° | 1/2 | WHEN 1/2 IS READY |
| | 180° | 4/4 | WHEN 4/4 IS READY |
| | 270° | 4/4 | WHEN 4/4 IS READY |
| PATTERN D | NOT ROTATED | 3/4 | WHEN 3/4 IS READY |
| | 90° | 4/4 | WHEN 4/4 IS READY |
| | 180° | 4/4 | WHEN 4/4 IS READY |
| | 270° | 1/2 | WHEN 1/2 IS READY |

| LAYOUT PATTERN | RESERVED SIZE |
|---|---|
| PATTERN A | 1/2 |
| PATTERN B | 1/2 |
| PATTERN C | 3/4 |
| PATTERN D | 3/4 |

FIG. 12

| LAYOUT PATTERN | ROTATION | RESERVED SIZE | START TIMING |
|---|---|---|---|
| PATTERN A | NOT ROTATED | 1/2 | WHEN 1/2 IS READY |
| | 90° | 3/4 | WHEN 3/4 IS READY |
| | 180° | 4/4 | WHEN 4/4 IS READY |
| | 270° | 4/4 | WHEN 4/4 IS READY |
| PATTERN B | NOT ROTATED | 1/2 | WHEN 1/2 IS READY |
| | 90° | 4/4 | WHEN 4/4 IS READY |
| | 180° | 4/4 | WHEN 4/4 IS READY |
| | 270° | 3/4 | WHEN 3/4 IS READY |
| PATTERN C | NOT ROTATED | 3/4 | WHEN 3/4 IS READY |
| | 90° | 1/2 | WHEN 1/2 IS READY |
| | 180° | 4/4 | WHEN 4/4 IS READY |
| | 270° | 4/4 | WHEN 4/4 IS READY |
| PATTERN D | NOT ROTATED | 3/4 | WHEN 3/4 IS READY |
| | 90° | 4/4 | WHEN 4/4 IS READY |
| | 180° | 4/4 | WHEN 4/4 IS READY |
| | 270° | 1/2 | WHEN 1/2 IS READY |

# METHOD, APPARATUS, AND COMPUTER PROGRAM PRODUCT FOR PROCESSING IMAGE DATA OF PLURAL IMAGES TO COMBINE FOR OUTPUT TO A RECORDING MEDIUM

CROSS-REFERENCE TO RELATED APPLICATIONS

The present application claims priority to and incorporates by reference the entire contents of Japanese priority document, 2006-300315 filed in Japan on Nov. 6, 2006.

BACKGROUND OF THE INVENTION

1. Technical Field

This disclosure relates to a method, an apparatus, and a computer program product for processing image data.

2. Description of the Related Art

In a conventional digital image forming apparatus, when a plurality of image data is combined and printed in 4-in-1 mode on a recording medium, input image data are temporarily stored in a work area reserved in a memory and then printed out.

Recently, a multifunction product (MFP) having a function of the digital image forming apparatus performs various processes (e.g., facsimile process) in addition to the processes for image data. The MFP needs to have an appropriate memory size required for each function to be executed. Situations where these various processes are simultaneously executed in the MFP are increasing.

In the MFP, the resolution of image data to be processed, such as printed, is getting improved. The improved resolution of the image data causes the memory size required to store the image data to increase. At present, when a plurality of image data with improved resolution is to be recorded on a sheet of paper medium, all the image data are stored in a memory area. These image data are processed using uncompressed data, and this requires a large memory size. If some other process is to be performed concurrently with the processes of the image data with the improved resolution, an enormous memory size needs to be consumed. If the MFP contains memory space required for these processes, this results in cost increase.

Japanese Patent Application Laid-Open No. 2005-79646 describes a technology of saving/loading image data to/from a hard disk drive (HDD) to reduce the memory space where the image data are stored.

However, in the described technology, read/write of the image data from/to the HDD takes more time than read/write thereof from/to the memory provided for the work area.

BRIEF SUMMARY

In an aspect of this disclosure, there is provided an apparatus for processing image data, including an input processor that performs an input processing of image data; a memory unit having a work area for combining the image data; a writing unit that sequentially writes the image data on which the input processing is performed in the work area of the memory unit; a determining unit that determines, when the image data are combined, whether image data to be arranged in a direction orthogonal to an image output direction are written in the work area; and an output processor that performs, when it is determined that the image data are written in the work area, an output processing of the image data to be arranged in the direction orthogonal to the image output direction.

In another aspect of this disclosure, there is provided a computer program product including a computer-usable medium having computer-readable program codes embodied in the medium that when executed cause a computer to execute input processing including performing an input processing of image data; writing sequentially writes the image data on which the input processing is performed in a work area of a memory unit for combining the image data; determining, when the image data are combined, whether image data to be arranged in a direction orthogonal to an image output direction are written in the work area; and output processing including performing, when it is determined that the image data are written in the work area, an output processing of the image data to be arranged in the direction orthogonal to the image output direction.

In yet another aspect of this disclosure, there is provided a method of processing image data, including performing an input processing of image data; writing sequentially writes the image data on which the input processing is performed in a work area of a memory unit for combining the image data; determining, when the image data are combined, whether image data to be arranged in a direction orthogonal to an image output direction are written in the work area; and output processing including performing, when it is determined that the image data are written in the work area, an output processing of the image data to be arranged in the direction orthogonal to the image output direction.

The aforementioned and other aspects, features, advantages and technical and industrial significance of this invention will would be better understood by reading the following detailed description, when considered in connection with the accompanying drawings.

BRIEF DESCRIPTION OF THE DRAWINGS

FIG. 12 is a schematic of a structure of a layout pattern-to-start timing correspondence management table;

DETAILED DESCRIPTION OF THE PREFERRED EMBODIMENTS

Exemplary embodiments of the present invention are explained in detail below with reference to the accompanying drawings.

The embodiments of the present invention are applicable to an MFP, which is an image processing device that includes a copier function, a facsimile (fax) function, a printer function, a scanner function, and a function of distributing an input image (a document image read by the scanner function and an image input by the printer function or the fax function).

Figure 1:
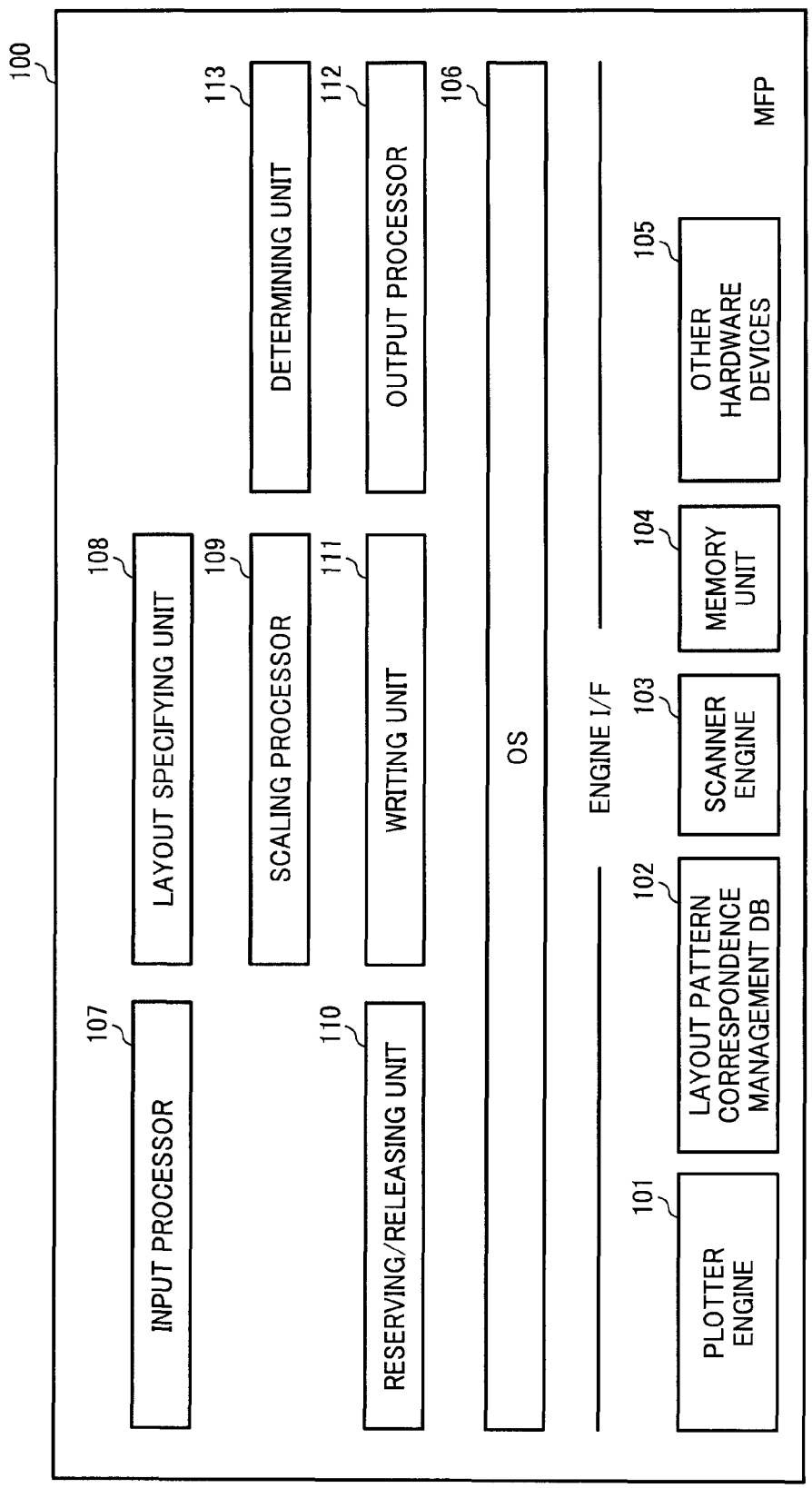
FIG. 1 is a block diagram of an MFP according to a first embodiment.

FIG. 1 is a block diagram of an MFP 100 according to a first embodiment of the present invention. The MFP 100 includes a plotter engine 101, a layout pattern correspondence management database (DB) 102, a scanner engine 103, and a memory unit 104 which are hardware devices to be controlled, other hardware devices 105, and an operating system (OS) 106 that controls these hardware devices. The MFP 100 also includes an input processor 107, a layout specifying unit 108, a scaling processor 109, a reserving/releasing unit 110, a writing unit 111, an output processor 112, and a determining unit 113, which are provided on the OS 106.

The plotter engine 101 prints image data on a paper medium. The other hardware devices 105 are various hardware devices, one of which is, for example, a communication interface (I/F) for a facsimile that transmits/receives information with other devices via a public communication line.

The memory unit 104 stores therein work areas for processes of image data or the like executed by the MFP 100. Although the memory unit 104 is formed with a random access memory (RAM) in which read/write is executed at a higher speed than that of an HDD in the first embodiment, the memory unit 104 can be formed with any one of generally used memory units.

Figures 2, 3:
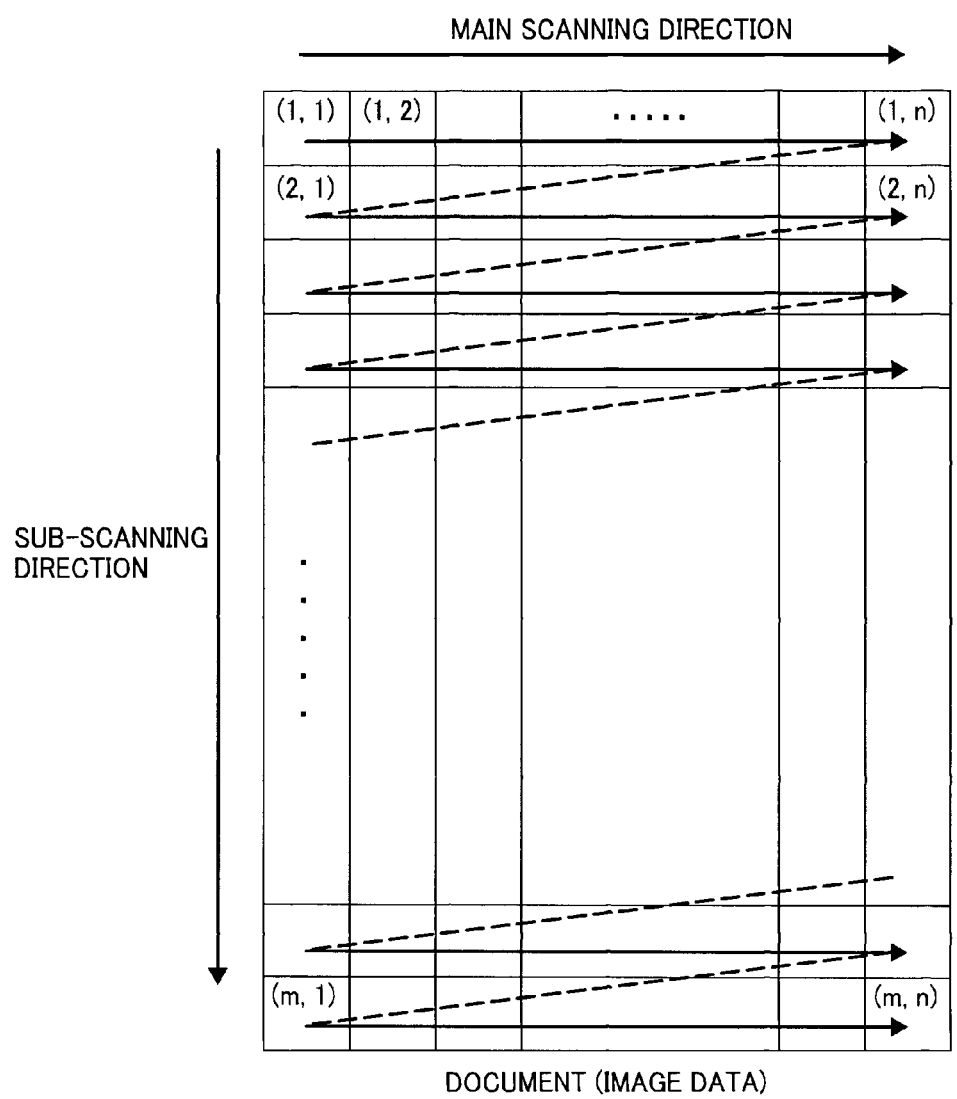
FIG. 2 is a schematic of a structure of a layout pattern correspondence management table of the MFP.
FIG. 3 is a schematic for explaining a read process executed by a scanner engine.

The layout pattern correspondence management DB 102 stores therein a layout pattern correspondence management table. FIG. 2 is a schematic of an example of the layout pattern correspondence management table. The layout pattern correspondence management table stores therein "layout pattern" and "reserved size" in correspondence to each other. The "reserved size" stores therein each size of the work areas to be reserved in the memory unit 104. The "layout pattern" is explained later. It is noted that the layout pattern correspondence management DB 102 is implemented by the HDD but can be formed with any one of generally used memory units.

The scanner engine 103 controls reading of a document by using a scanner. FIG. 3 is a schematic for explaining a read process executed by the scanner engine 103. The scanner engine 103 reads the image data from top left to bottom right. To perform the read process in this manner, the data need to be arrayed in a main scanning direction (called "line").

Even if an image process is executed in a different configuration, the process is performed on image data from top left to bottom right in the same manner as shown in FIG. 3.

The OS 106 controls the hardware devices according to each request from the input processor 107, the layout specifying unit 108, the scaling processor 109, the reserving/releasing unit 110, the writing unit 111, the output processor 112, and the determining unit 113.

The input processor 107 inputs the image data read by the scanner engine 103. The image data to be input by the input processor 107 may not only be the image data read by the scanner engine 103 but may be image data stored in the HDD or may be image data received via a network.

Figure 4:
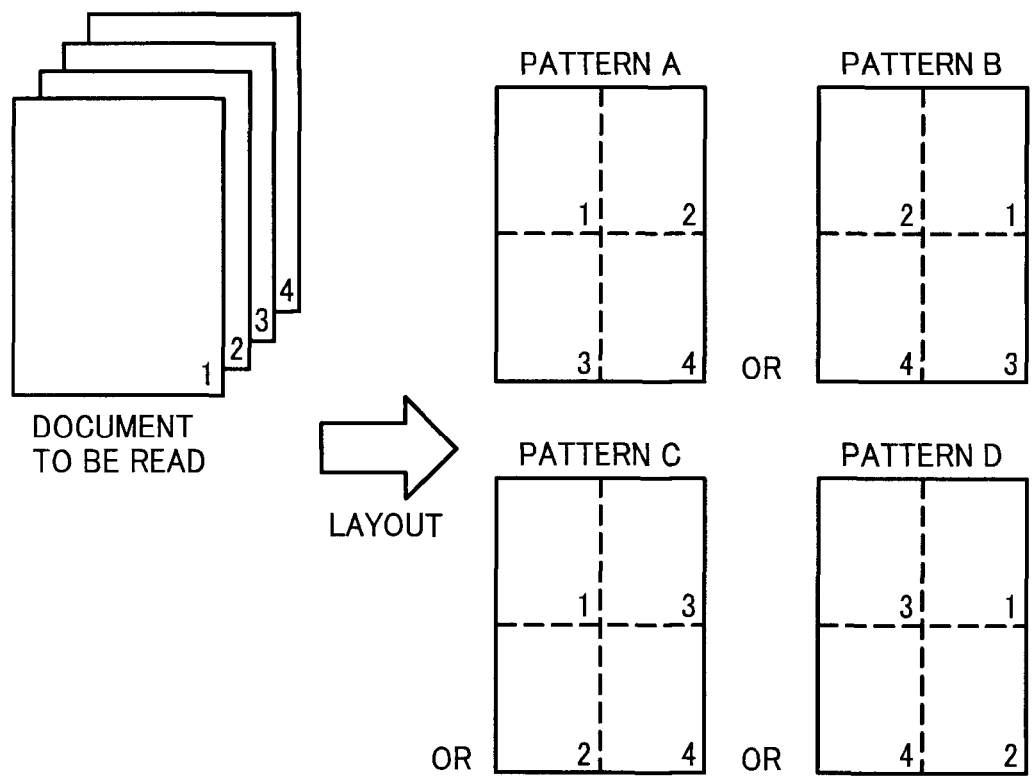
FIG. 4 is a schematic of an example of layout patterns for image combination in the 4-in-1 mode performed by a layout specifying unit.

The layout specifying unit 108 specifies layout of image data on a paper medium. FIG. 4 is a schematic of an example of layout patterns upon combination in the 4-in-1 mode performed by the layout specifying unit 108. When image data are to be combined in the 4-in-1 mode, the layout specifying unit 108 specifies layout of the image data from among four layout patterns. The four layout patterns are explained below.

At first, the pattern A represents a pattern obtained by laying out four image data on upper left, upper right, lower left, and lower right of a paper medium in the order of their inputs. Next, the pattern B represents a pattern by laying out the four image data on upper right, upper left, lower right, and lower left thereof in the order of their inputs. The pattern C represents a pattern obtained by laying out the four image data on upper left, lower left, upper right, and lower right thereof in the order of their inputs. The pattern D represents a pattern obtained by laying out the four image data on upper right, lower right, upper left, and lower left thereof in the order of their inputs. These layout patterns are used to perform processes.

The reserving/releasing unit 110 determines a memory size used for work according to each specified layout pattern, and reserves the memory size as a work area in the memory unit 104. To specify the size of work area according to each layout pattern, the reserving/releasing unit 110 also determines each size of work areas to be reserved by referring to the layout pattern correspondence management table shown in FIG. 2. Moreover, the reserving/releasing unit 110 releases the reserved work area after all the image data are printed.

Figure 5A:
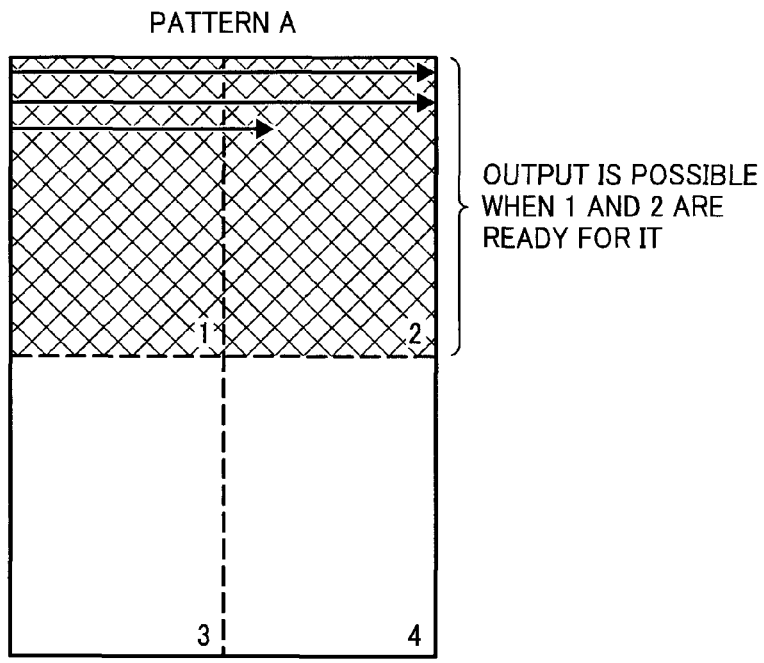
FIG. 5A is a schematic of a state where a pattern A as a layout pattern can be started to be printed in a plotter engine.
Figure 5B:
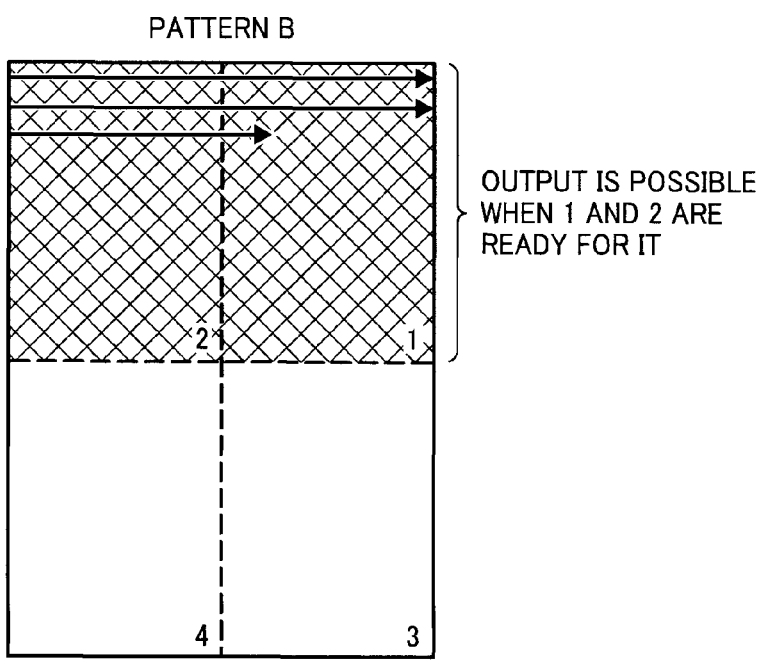
FIG. 5B is a schematic of a state where a pattern B as the layout pattern can be started to be printed in the plotter engine.

FIGS. 5A and 5B are schematics of each relationship between each layout pattern of image data on a paper medium and each state where the plotter engine 101 can start printing. The number in each of the layout patterns represents the order of the input image data.

In the case of the layout patterns shown in FIGS. 5A and 5B, each image data is printed by moving along each paper medium from top to bottom thereof according to a printing process (drawing process). In other words, the direction from top to bottom of the paper medium is an image output direction. When image data are combined in the 4-in-1 mode on the paper medium, the MFP 100 separately performs the output process on the upper half of the layout pattern where two image data orthogonal to the image output direction are laid out and on the lower half thereof where the other two image data orthogonal to the image output direction are laid out. The details thereof are explained below.

FIG. 5A represents the pattern A. In the case of the pattern A, the upper half of the paper medium is supposed to be laid out upon input of two image data (a first image and a second image). And the plotter engine 101 prints the image data on the paper medium in the arrow direction as shown in FIG. 5A. Therefore, when only the upper half of the paper medium is to be printed, then the printing can be started at this stage. Thus, even if the other two image data are not yet input after the two image data are input, the plotter engine 101 starts printing.

More specifically, in conventional devices, the input processes of four image data are finished, and then the four image data are output to the plotter engine 101. This requires a work area equivalent to the four image data. On the other hand, in the MFP 100 according to the first embodiment, when only the upper half of the layout pattern is laid out, the two image data are output to the plotter engine 101. In other words, the work area is reserved only for the two image data. Accordingly, the size to be reserved as the work area can be reduced.

In the first embodiment, the process performed next to the scaling (combination) process is not necessarily limited to an image output process. Specifically, the image processes may be performed in any order, and thus, the image processes such as the scaling process and the rotation process may be performed after the image data is written in the work area.

In other words, the pattern A shown in FIG. 5A and the pattern B shown in FIG. 5B can be printed at the stage at which only the upper half of each paper medium is laid out.

Figure 6:
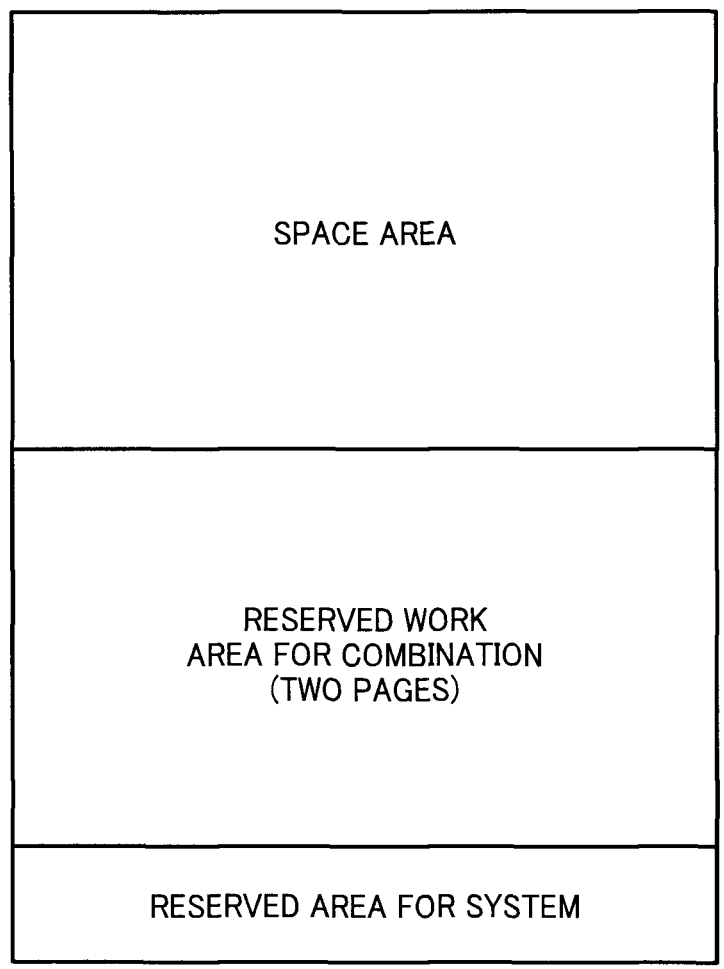
FIG. 6 is a schematic of an example of a work area used for combination which a reserving/releasing unit reserves in a memory unit in the case of the pattern A and the pattern B.

FIG. 6 is a schematic of an example of a work area used for combination which the reserving/releasing unit 110 reserves in the memory unit 104 in the case of the pattern A and the pattern B. As shown in FIG. 6, the reserving/releasing unit 110 reserves a work area only for two pages, i.e., two out of the conventionally required four pages (½), and therefore, the size used in the memory unit 104 (memory) can be reduced. Thus, even if the memory to be incorporated in the MFP 100 has small capacity, the work area used for other processes can sufficiently be ensured.

Figure 7A:
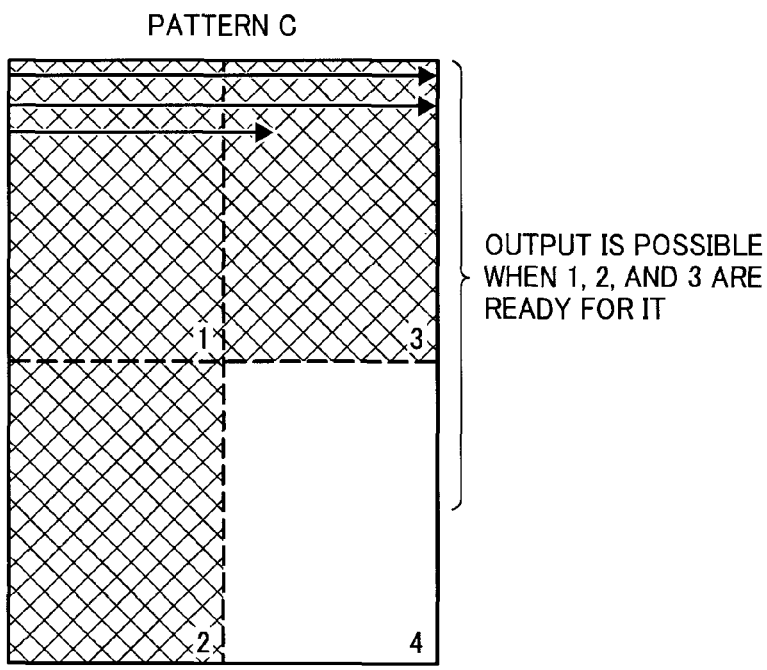
FIG. 7A is a schematic of a state where a pattern C as the layout pattern can be started to be printed in the plotter engine.
Figure 7B:
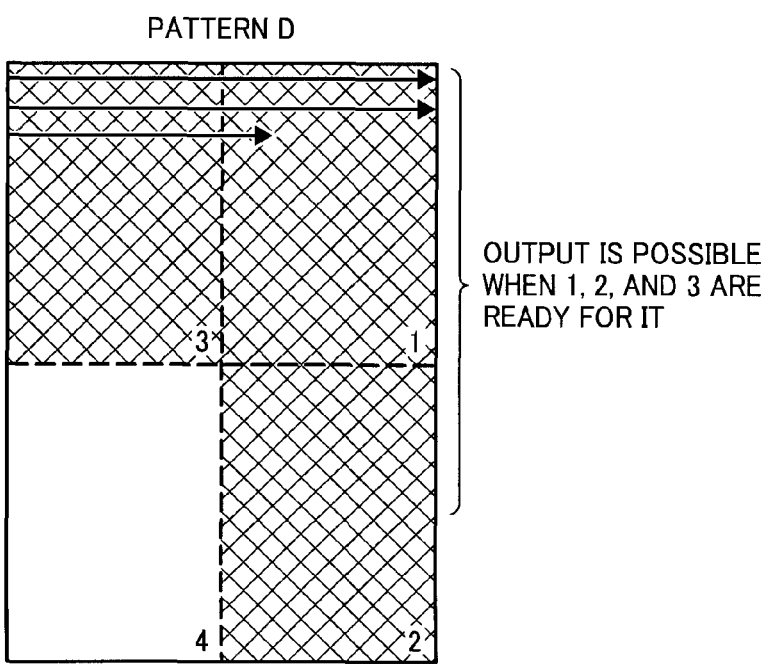
FIG. 7B is a schematic of a state where a pattern D as the layout pattern can be started to be printed in the plotter engine.

FIGS. 7A and 7B are schematics of each relationship between each layout pattern of image data on the paper medium and each state where the plotter engine 101 can start printing. The number in each of the layout patterns represents the order of the input image data.

FIG. 7A represents the pattern C. In the case of the pattern C, even if two image data are input, the two image data cannot be laid out in the upper half of the paper medium in the direction orthogonal to the image output direction, and thus, the two image data cannot be output to the plotter engine 101. However, when three image data are input, then the two image data are laid out in the upper half thereof, which allows the image data to be output to the plotter engine 101.

FIG. 7B represents the pattern D. When three image data are input, the image data can surely be output to the plotter engine 101.

Figure 8:
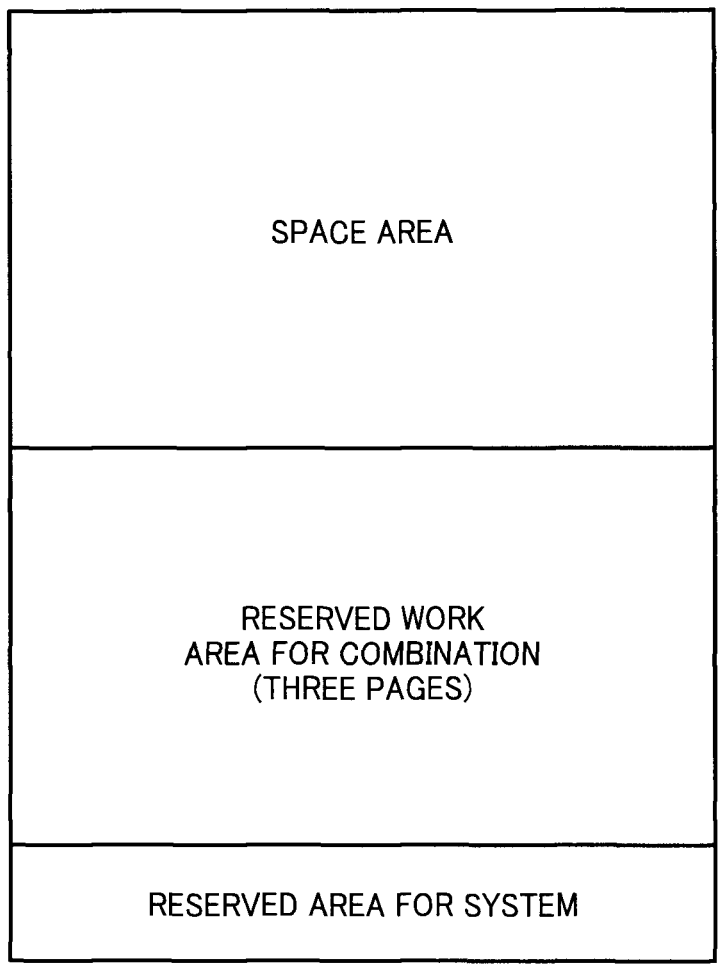
FIG. 8 is a schematic of an example of a work area used for combination which the reserving/releasing unit reserves in the memory unit in the case of the pattern C and the pattern D.

FIG. 8 is a schematic of an example of a work area used for combination which the reserving/releasing unit 110 reserves in the memory unit 104 in the case of the pattern C and the pattern D. As shown in FIG. 8, the reserving/releasing unit 110 reserves a work area only for three pages, i.e., three out of the conventionally required four pages (¾), and therefore, the size used in the memory can be reduced. Thus, even if the memory to be incorporated in the MFP 100 has small capacity, the work area used for other processes can sufficiently be ensured.

The writing unit 111 writes the input image data in the work area of the memory unit 104 reserved by the reserving/releasing unit 110. The writing unit 111 also writes the image data enlarged or reduced by the scaling processor 109, explained later, in the work area.

The scaling processor 109 reads the image data stored in the work area by the writing unit 111, and enlarges or reduces the image data so as to be fitted in the area laid out on the paper medium specified by the layout specifying unit 108. A scaling factor is decided according to the size of image data to be input, the size of a paper medium, and the number of image data to be combined. Furthermore, the scaling processor 109 invokes an application specific integrated circuit (ASIC) for combination (not shown) via an image processing driver, to scale down or reduce the image data. Any method may be used for a scaling process method, and thus explanation thereof is omitted.

When the image processes such as the scaling process are ended and the image data are combined to be output, the determining unit 113 determines whether the image data laid out in the direction orthogonal to the image output direction are written in the work area.

When it is determined that the image data are written in the work area, the output processor 112 reads only the image data to be laid out in the orthogonal direction from the work area and outputs the image data to the plotter engine 101.

Figure 9:
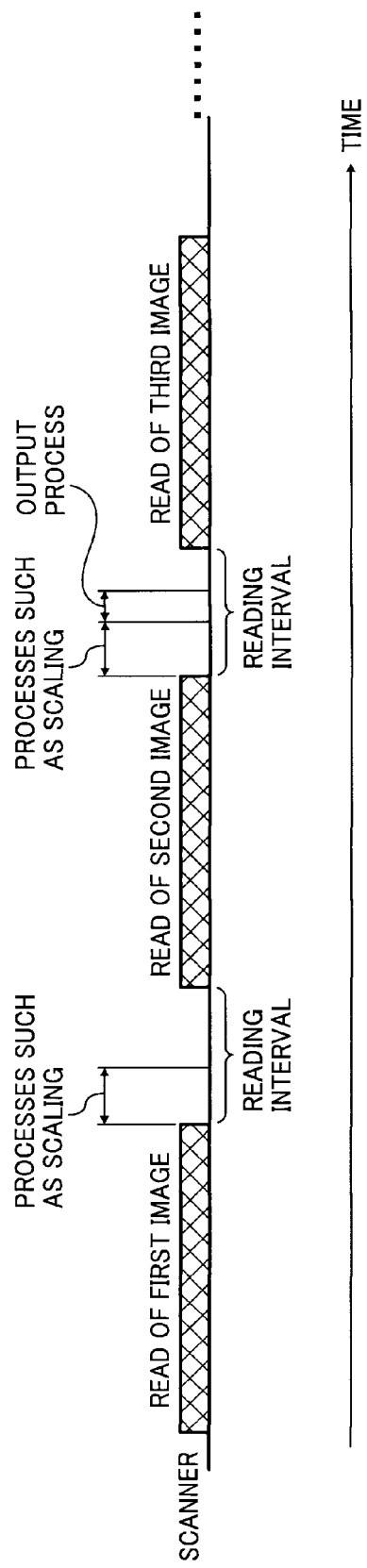
FIG. 9 is a schematic of timings at which a scaling process and an output process are performed on image data read by the scanner engine.

FIG. 9 is a schematic of timings at which the scaling process and the output process are performed on the image data read by the scanner engine 103 in the MFP 100. The example of FIG. 9 shows the timings at which the image data for the first image and the second image are output before the image data for a third image starts to be read when the layout pattern is the pattern A or the pattern B.

When the scanner engine 103 (scanner) of FIG. 9 is to read the image data, the reading can be automatically performed by an automatic document feeder (ADF). A predetermined time interval is required in a period from the end of reading a document to the start of reading the next document due to the mechanism of the ADF. Hence, the scaling processor 109 and the output processor 112 of the MFP 100 according to the first embodiment execute the processes during the time interval. Accordingly, there occurs no delay in the processing time even if the output process is performed in the middle of the read process.

As shown in FIG. 9, the work area where the image data for the first image and the second image are stored can be made empty before the image data for the third image starts to be read. Therefore, the work area can be used for any other processes.

Figure 10:
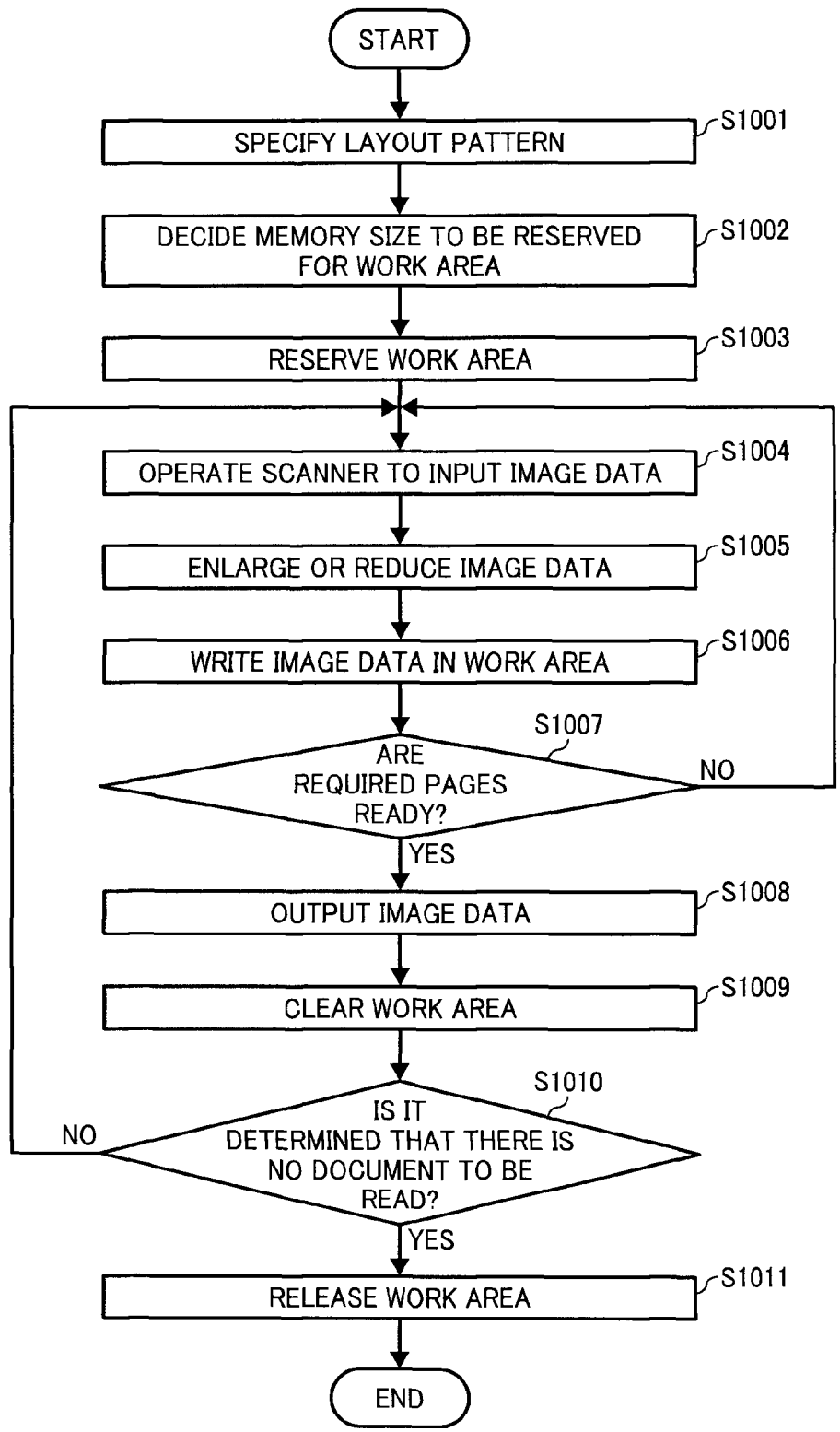
FIG. 10 is a flowchart of a procedure from the end of reading a document to the end of the output process in the MFP according to the first embodiment.

FIG. 10 is a flowchart of a procedure from the end of reading a document to the end of the output process in the MFP 100 according to the first embodiment.

At first, the layout specifying unit 108 specifies a layout pattern based on the setting of "4-in-1" mode or the like entered through the operation panel on the MFP 100, and specifies layout of the image data on a paper medium according to the layout pattern (step S1001).

Next, the reserving/releasing unit 110 refers to the layout pattern correspondence management table of the layout pattern correspondence management DB 102, and decides a memory size to be reserved for work based on the specified layout pattern (step S1002).

The reserving/releasing unit 110 then reserves the decided memory size as a work area in the memory unit 104 (step S1003).

The input processor 107 operates the scanner engine 103 so as to input the image data from the document (step S1004). The writing unit 111 writes the input image data in the reserved work area.

The scaling processor 109 reads the stored image data from the work area, and enlarges or reduces the image data so as to be fitted in a predetermined area of a specified paper medium according to the layout pattern (step S1005).

Next, the writing unit 111 again writes the enlarged or reduced image data in the work area (step S1006).

The determining unit 113 determines whether required image data are ready for the output process (step S1007). When it is not determined that the required image data are ready (NO at step S1007), then the input processor 107 starts inputting the next image data (step S1004).

When it is determined that the required image data are ready (YES at step S1007), the output processor 112 reads only the image data which are stored in the work area and are to be laid out in an area to be printed, and outputs the image data according to the layout specified by the layout specifying unit 108 (step S1008).

After the output process is finished, the work area is cleared (step S1009). Although the work area is cleared in the first embodiment, the clearing process may be omitted because the work area can simply be overwritten with image data.

Thereafter, the input processor 107 determines whether there is no document to be read (step S1010). When it is not determined that there is no document to be read (NO at step S1010), the input processor 107 again inputs the image data (step S1004).

When it is determined that there is no document to be read (YES at step S1010), the reserving/releasing unit 110 releases the reserved work area (step S1011).

With these processes, only the required memory size can be reserved as the work area. As a result, there is no need to store all the image data to be combined in an output medium, and thus, the memory usage can be reduced.

The case where the document is read by the scanner engine 103 is explained in the first embodiment. However, the first embodiment is also applicable to a case where image data stored in the HDD is input therefrom or to a case where image data is input from any other communication device connected thereto via a network.

In the MFP 100 according to the first embodiment, an example of using the paper medium as the output medium is explained. However, in addition to the above example, image data upon e-mail transmission may be the output medium. As explained above, the first embodiment is applicable to not only the case where the image data is printed by the plotter engine 101 but also various situations.

In the MFP 100 according to the first embodiment, when image data with a resolution of, for example, 600 dpi (32-bit RGB image data) are combined in the 4-in-1 mode, the usage of a work area of 66 megabytes (MB) at maximum equivalent in size to A4 paper can be reduced, and the usage of a work area of 132.8 MB at maximum equivalent in size to A3 paper can be reduced.

Other examples include those as follows. When image data with a resolution of 600 dpi (16-bit CMYK image data) are combined in the 4-in-1 mode, the usage of a work area of 33.2 MB at maximum equivalent in size to A4 paper can be reduced, and the usage of a work area of 66.4 MB at maximum equivalent in size to A3 paper can be reduced.

In the MFP 100 according to the first embodiment, the image data is enlarged/reduced and output in a period from the end of inputting the image data to an input of the next image data (namely, before the next image data starts to be written in the work area), the processing time required for these processes can thereby be reduced, and thus, improving the processing speed. Moreover, the output process is started before all the images are ready, which allows reduction in time required for ending of the output.

In the MFP 100 according to the first embodiment, by previously reserving the work area, any area other than the work area can be used for other processes, and thus, the memory area of the memory unit 104 can be shared with a plurality of processes.

Figure 11:
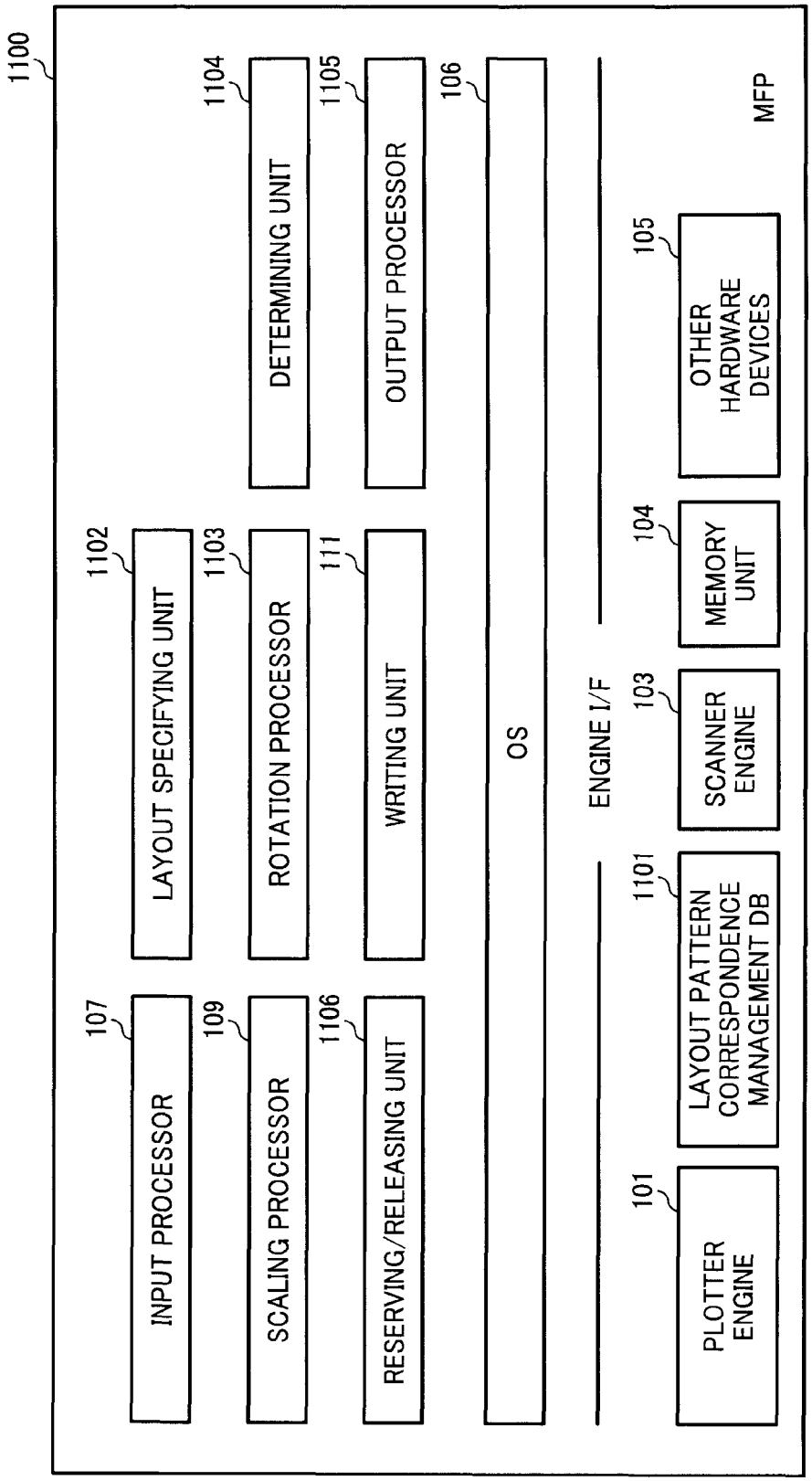
FIG. 11 is a block diagram of an MFP according to a second embodiment.

FIG. 11 is a block diagram of an MFP 1100 according to a second embodiment of the present invention. The MFP 1100 is different from the MFP 100 according to the first embodiment in those points as follows. A rotation processor 1103 is newly added, and the layout specifying unit 108 is changed to a layout specifying unit 1102 which performs different processes. The output processor 112 is changed to an output processor 1105 which performs different processes, and the reserving/releasing unit 110 is changed to a reserving/releasing unit 1106 which performs different processes. The determining unit 113 is changed to a determining unit 1104 which performs different processes, and the layout pattern correspondence management DB 102 is changed to a layout pattern correspondence management DB 1101 which stores therein a different table. In the following, the same reference numerals are assigned to those corresponding to the components of the first embodiment, and explanation thereof is omitted.

The layout pattern correspondence management DB 1101 stores therein a layout pattern-to-start timing correspondence management table. FIG. 12 is a schematic of a structure of the layout pattern-to-start timing correspondence management table. The layout pattern-to-start timing correspondence management table stores therein "layout pattern", "rotation", "reserved size", and "start timing" in correspondence to each other.

The "layout pattern" and the "reserved size" are the same as these according to the first embodiment. The "rotation" stores therein each degree of rotation when an image is rotated in, for example, the clockwise in the second embodiment. The "start timing" stores therein each start timing based on image data which are ready for output.

Similarly to the first embodiment, the determining unit 1104 determines whether image data to be laid out in the direction orthogonal to the image output direction are written in a work area when the image data are combined.

By referring to the layout pattern-to-start timing correspondence management table of FIG. 12, the determining unit 1104 decides a start timing from the layout pattern and an angle in the rotation process. For example, when the layout pattern is the pattern A and the degree of rotation is 90 degrees, the determining unit 1104 decides a time point as a start timing when ¾ or three out of four image data are ready, namely, when the first to the third images are read.

After it is determined that the image data are written in the work area, the determining unit 1104 determines whether the rotation process is required. The timing of performing the rotation process is explained later.

The layout specifying unit 1102 specifies the layout of the image data on the paper medium based on the layout pattern and the degree of rotation in the rotation process. The layout in the case of the rotation process is explained later.

The reserving/releasing unit 1106 decides a memory amount used for work based on the layout pattern and the degree of rotation, and reserves the memory amount as a work area in the memory unit 104. To determine the memory amount as the work area corresponding to the layout pattern and the degree of rotation, the reserving/releasing unit 1106 refers to the layout pattern-to-start timing correspondence management table shown in FIG. 12, and determines the work area to be reserved.

Figure 13:
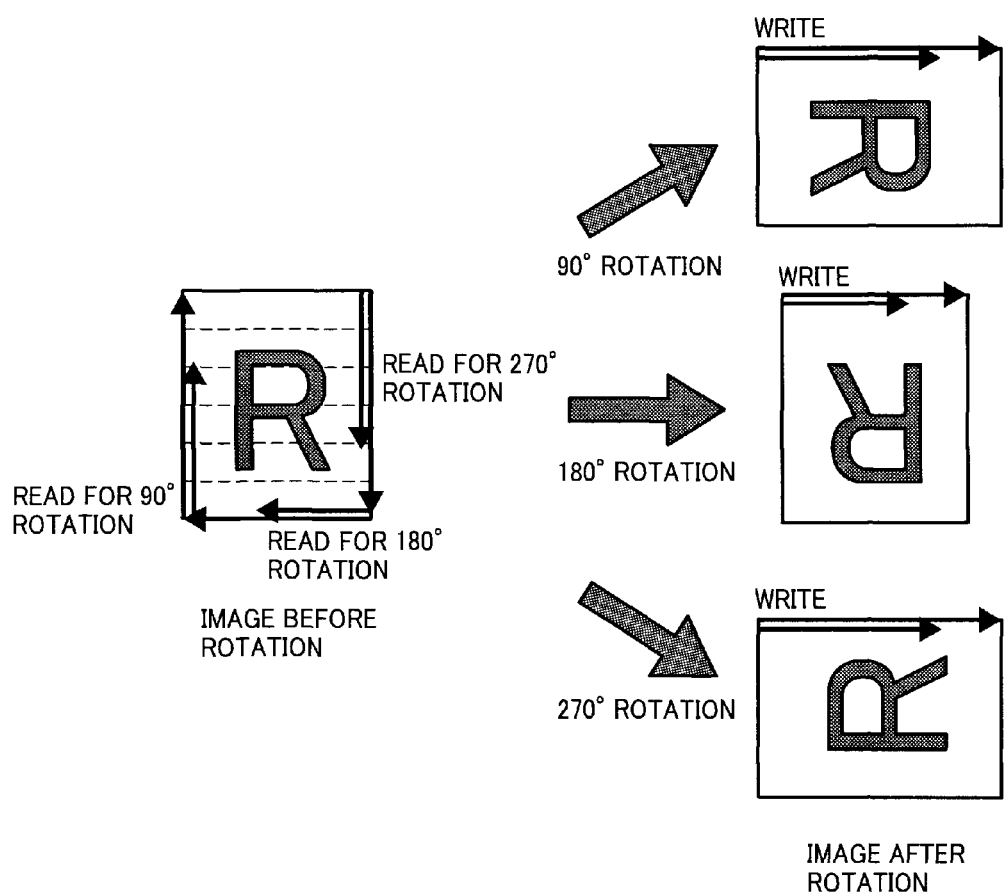
FIG. 13 is a schematic for explaining how a rotation processor rotates a piece of image data.

The rotation processor 1103 rotates the image data stored in the work area of the memory unit 104 at a start timing decided by the determining unit 1104. The writing unit 111 writes the image data, after being rotated, in the work area of the memory unit 104. FIG. 13 is a schematic for explaining how the rotation processor 1103 rotates a piece of image data.

As shown in FIG. 13, in the case of a 90-degree rotation, the rotation processor 1103 reads image data before rotation stored in the memory unit 104 from bottom left, and the writing unit 111 starts writing the read image data from top left. In the case of a 180-degree rotation, the rotation processor 1103 reads the image data from bottom right, and the writing unit 111 starts writing the read image data from top left. In the case of a 270-degree rotation, the rotation processor 1103 reads the image data from top right, and the writing unit 111 starts writing the read image data from top left. The writing unit 111 unifies the writing directions in the above manner, and the start procedures of the next processes of the respective rotation processes can thereby be unified.

FIGS. 14A to 14D are schematics for explaining each direction of reading of image data for each layout pattern before the image data is rotated. It is noted that the writing directions are unified into writing from top left and hence explanation thereof is omitted. Moreover, the layout specifying unit 1102 specifies each layout so that the respective reading directions shown in FIGS. 14A to 14D allow the writing directions to start from top left.

Figure 14A:
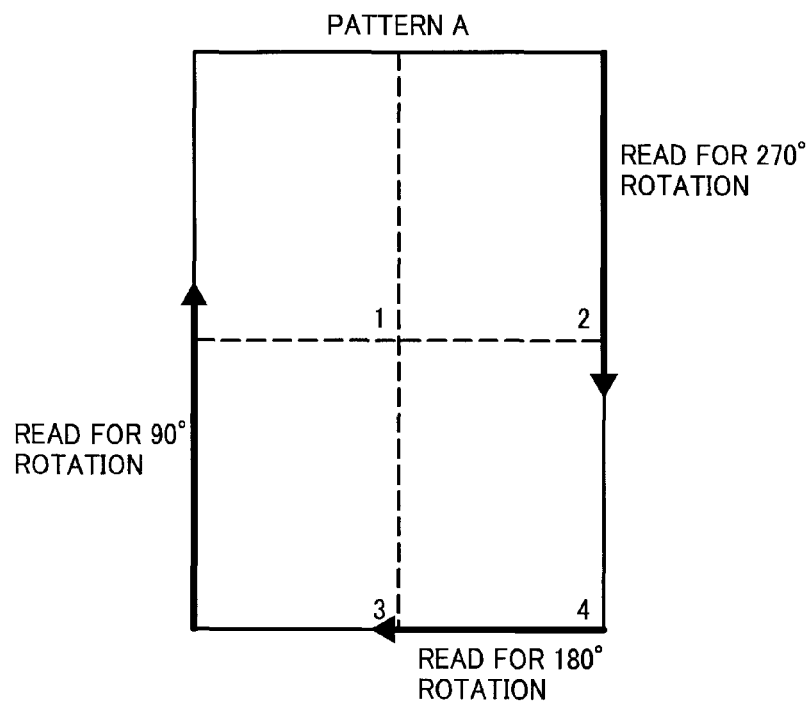
FIG. 14A is a schematic of a direction of reading of the pattern A before it is rotated.

As shown in FIG. 14A, the process for the 90-degree rotation of the pattern A can be started when image data 1 and 3 are ready for rotation. The process for the 180-degree rotation of the pattern A can be started when the image data 3 and 4 are ready. The process for the 270-degree rotation of the pattern A can be started when image data 2 and 4 are ready. More specifically, as shown in the layout pattern-to-start timing correspondence management table of FIG. 12, in the case of the 90-degree rotation, the reserved size is "3/4", in the case of the 180-degree rotation, the reserved size is "4/4", and in the case of the 270-degree rotation, the reserved size is "4/4". As a result, when the degree of rotation is 0 degree and 90 degrees, the work area to be reserved can be reduced.

Figure 14B:
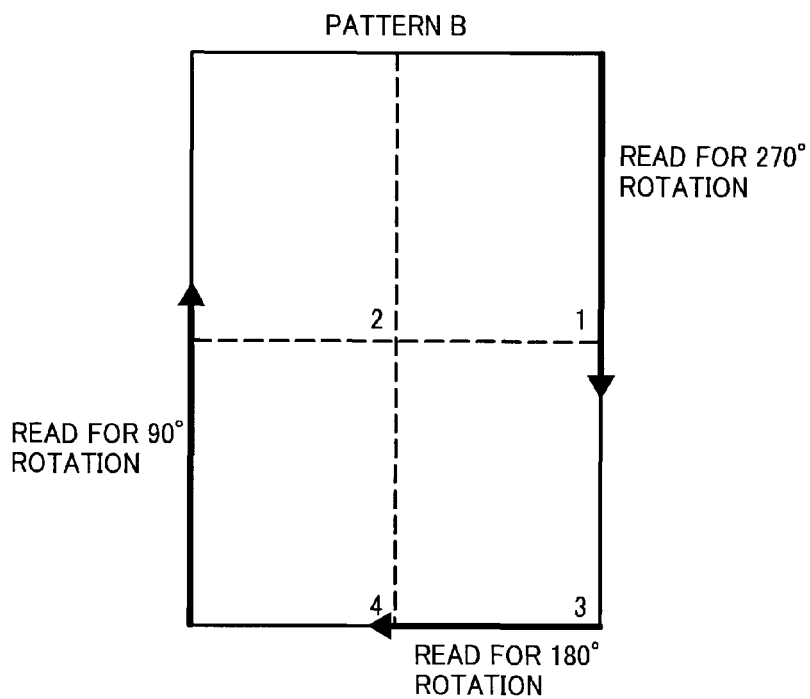
FIG. 14B is a schematic of a direction of reading of the pattern B before it is rotated.

As shown in FIG. 14B, the process for the 90-degree rotation of the pattern B can be started when the image data 2 and 4 are ready for rotation. The process for the 180-degree rotation of the pattern B can be started when the image data 3 and 4 are ready. The process for the 270-degree rotation of the pattern B can be started when the image data 1 and 3 are ready. More specifically, as shown in the layout pattern-to-start timing correspondence management table of FIG. 12, in the case of the 90-degree rotation, the reserved size is "4/4", in the case of the 180-degree rotation, the reserved size is "4/4", and in the case of the 270-degree rotation, the reserved size is "3/4". As a result, when the degree of rotation is 0 degree and 270 degrees, the work area to be reserved can be reduced.

Figure 14C:
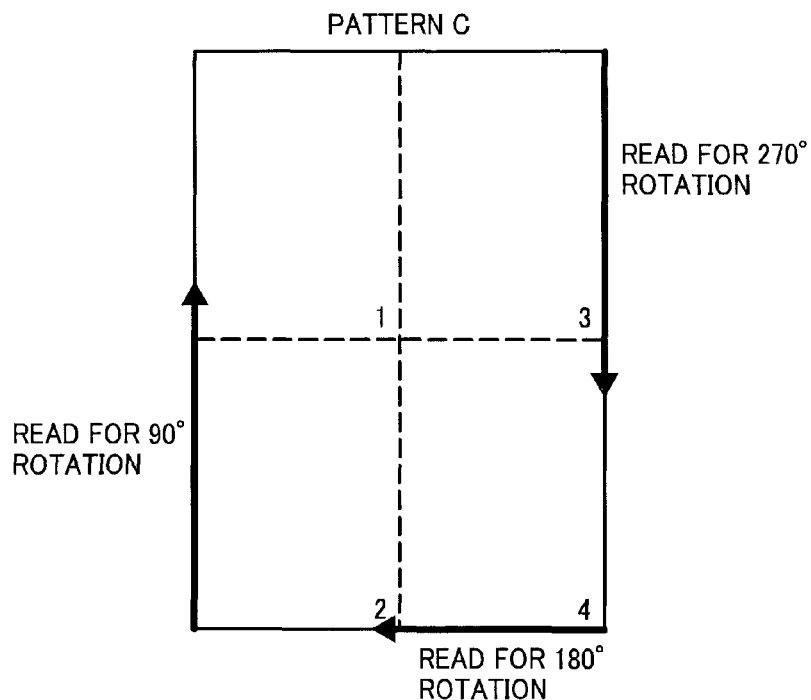
FIG. 14C is a schematic of a direction of reading of the pattern C before it is rotated.

As shown in FIG. 14C, the process for the 90-degree rotation of the pattern C can be started when the image data 1 and 2 are ready for rotation. The process for the 180-degree rotation of the pattern C can be started when the image data 2 and 4 are ready. The process for the 270-degree rotation of the pattern C can be started when the image data 3 and 4 are ready. More specifically, as shown in the layout pattern-to-start timing correspondence management table of FIG. 12, in the case of the 90-degree rotation, the reserved size is "1/2", in the case of the 180-degree rotation, the reserved size is "4/4", and in the case of the 270-degree rotation, the reserved size is "4/4". As a result, when the degree of rotation is 0 degree and 90 degrees, the work area to be reserved can be reduced.

Figure 14D:
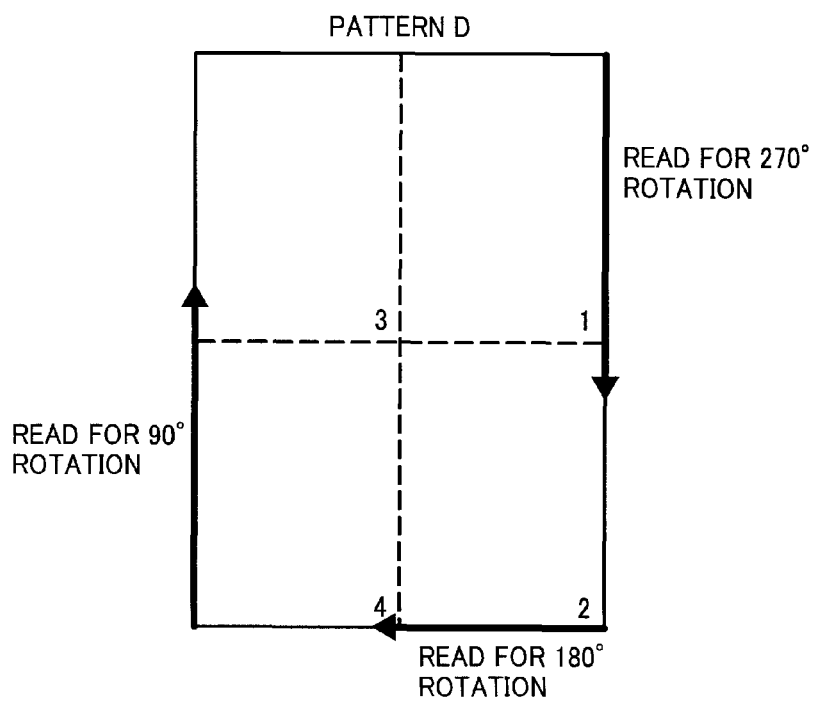
FIG. 14D is a schematic of a direction of reading of the pattern D before it is rotated.

As shown in FIG. 14D, the process for the 90-degree rotation of the pattern D can be started when the image data 3 and 4 are ready for rotation. The process for the 180-degree rotation of the pattern D can be started when the image data 2 and 4 are ready. The process for the 270-degree rotation of the pattern D can be started when the image data 1 and 2 are ready. More specifically, as shown in the layout pattern-to-start timing correspondence management table of FIG. 12, in the case of the 90-degree rotation, the reserved size is "4/4", in the case of the 180-degree rotation, the reserved size is "4/4", and in the case of the 270-degree rotation, the reserved size is "1/2". As a result, when the degree of rotation is 0 degree and 270 degrees, the work area to be reserved can be reduced.

When the rotation process is executed in the above manner, the work area can be reduced depending on the situations.

After the image processes such as the scaling process and the rotation process are finished, the output processor 1105 outputs the image data stored in the work area of the memory unit 104 to the plotter engine 101. If the rotation processor 1103 does not perform the rotation process, the output processor 1105 starts the output process at the start timing decided by the determining unit 1104. It is noted that when the rotation processor 1103 performs the rotation process, the output processor 1105 starts the output process after the rotation process is finished.

Figure 15:
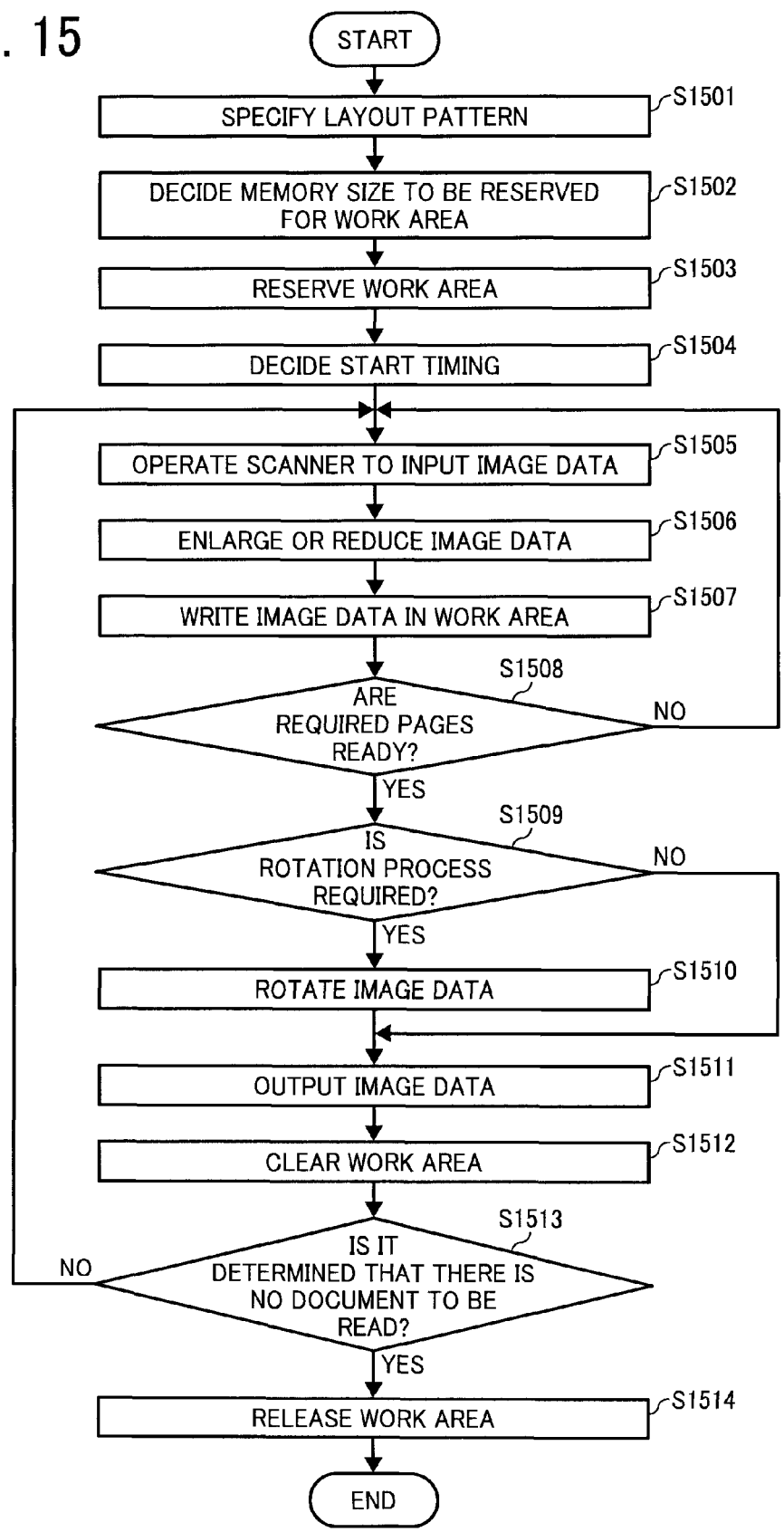
FIG. 15 is a flowchart of a procedure from the end of reading a document to the end of the output process in the MFP according to the second embodiment.

FIG. 15 is a flowchart of a procedure from the end of reading a document to the end of the output process in the MFP 1100 according to the second embodiment.

At first, the layout specifying unit 1102 specifies a layout pattern and the degree of rotation based on setting of, for example, "4-in-1" mode and setting for rotation of the image data which are entered through the operation panel on the MFP 1100, and specifies layout of the image data on a paper medium according to the layout pattern and the degree of rotation (step S1501).

The reserving/releasing unit 1106 refers to the layout pattern-to-start timing correspondence management table of the layout pattern correspondence management DB 1101, to decide a memory size to be reserved for work based on the specified layout pattern (step S1502).

Next, the reserving/releasing unit 1106 reserves the decided memory size as a work area in the memory unit 104 (step S1503).

The determining unit 1104 refers to the layout pattern-to-start timing correspondence management table, and decides each timing of starting processes for pieces of image data read upon starting of the rotation process or the output process, based on the layout pattern and the degree of rotation (step S1504).

Similarly to the processes from step S1004 to step S1006 according to the first embodiment, the processes from the input process of image data to the write process of the image data having been subjected to the image processes in the work area are performed (steps S1505 to S1507).

The determining unit 1104 determines whether required image data are ready for output (step S1508). When it is not determined that the required image data are ready (NO at step S1508), then the input processor 107 starts inputting the next image data (step S1505).

When it is determined that the required image data are ready (YES at step S1508), the determining unit 1104 determines whether the rotation process is required (step S1509). When it is not determined that the rotation process is required (NO at step S1509), the rotation processor 1103 itself does not particularly perform any process.

When it is determined that the rotation process is required (YES at step S1509), the rotation processor 1103 rotates the image data stored in the work area according to the degree of rotation. Thereafter, the writing unit 111 writes the rotated image data in the work area (step S1510).

Next, the output processor 1105 reads the image data stored in the work area and outputs the image data according to the layout specified by the layout specifying unit 1102 (step S1511).

Similarly to the processes from steps S1009 to 1011 according to the first embodiment, the processes such that the work area is cleared and released are performed (step S1512 to step S1514).

According to the MFP 1100 of the second embodiment, even if the image data is rotated, an appropriate memory size can be reserved as the work area, and thus, the memory size used as the work area can be reduced.

According to the second embodiment, the image data is written in the work area and then the image data is rotated when required pages are ready for rotation. However, the second embodiment is not limited to the above order in which the image processes are performed. Hence, in a third embodiment of the present invention, an example of writing image data due to image processes in a work area after the rotation process is finished is explained below.

Figure 16:
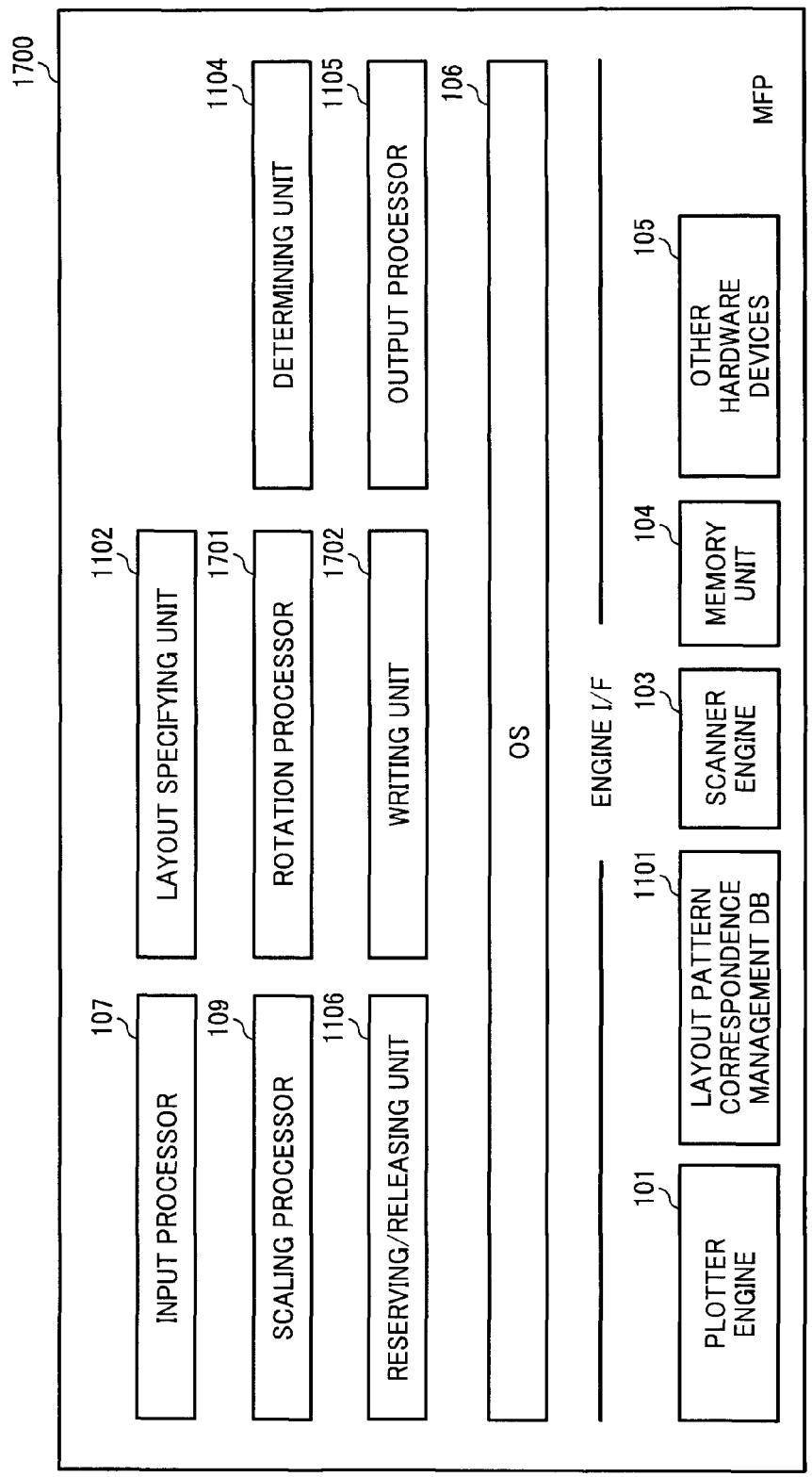
FIG. 16 is a block diagram of an MFP according to a third embodiment.

FIG. 16 is a block diagram of an MFP 1700 according to the third embodiment. The MFP 1700 is different from the MFP 1100 according to the second embodiment in those points as follows. A rotation processor 1701 and a writing unit 1702 are configured so that respective procedures thereof are different from these of the rotation processor 1103 and the writing unit 111. In the following, the same reference numerals are assigned to those corresponding to the components of the second embodiment, and explanation thereof is omitted.

The rotation processor 1701 rotates the enlarged or reduced image data according to need. It is noted that the method of the rotation process and the determining method implemented by the determining unit 1104 are the same as these of the second embodiment and thus explanation thereof is omitted.

The writing unit 1702 writes the image data in the work area of the memory unit 104 reserved by the reserving/releasing unit 1106 after the rotation process is finished if the rotation process is to be performed, or after the scaling process is finished if the rotation process is not performed.

Figure 17:
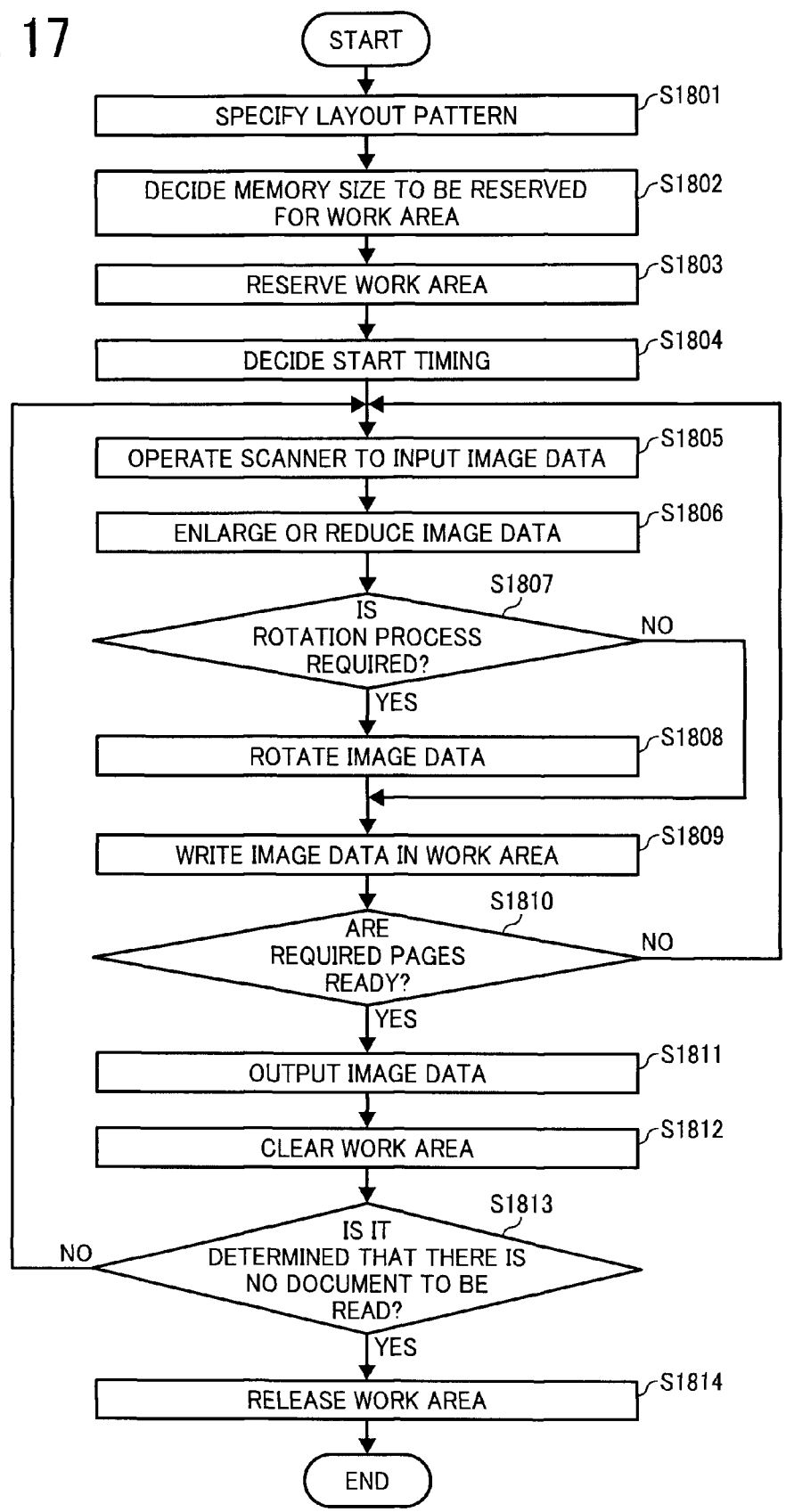
FIG. 17 is a flowchart of a procedure from the end of reading a document to the end of the output process in the MFP according to the third embodiment.

FIG. 17 is a flowchart of a procedure from the end of reading a document to the end of the output process in the MFP 1700 according to the third embodiment.

At first, the MFP 1700 performs processes from a specification process of a layout pattern to a scaling process of image data similarly to the processes from step S1501 to step S1506 according to the second embodiment (step S1801 to step S1806).

The determining unit 1104 determines whether the rotation process is required (step S1807). When it is not determined that the rotation process is required (NO at step S1807), the rotation processor 1103 itself does not particularly perform any process.

When it is determined that the rotation process is required (YES at step S1807), the rotation processor 1701 rotates the image data stored in the work area according to the degree of rotation (step S1808).

Thereafter, the writing unit 1702 writes the image data in the work area (step S1809).

Next, the determining unit 1104 determines whether required image data are ready for output (step S1810). When it is not determined that the required image data are ready (NO at step S1810), then the input processor 107 starts the input of the next image data (step S1805).

When it is determined that the required image data are ready (YES at step S1810), the output processor 1105 reads the image data stored in the work area and outputs the read image data according to the layout specified by the layout specifying unit 1102 (step S1811).

Similarly to the processes from steps S1512 to S1514 according to the second embodiment, the processes such that the work area is cleared and released are performed (step S1812 to step S1814).

By performing the processes, the MFP 1700 can reduce the area which stores therein the enlarged or reduced image data before it is rotated. For example, when image data are combined in the 4-in-1 mode, the MFP 1100 according to the second embodiment needs to store therein two to four pieces of the enlarged or reduced image data before the rotation process is performed. On the other hand, the MFP 1700 according to the third embodiment stores therein only one piece of the enlarged or reduced image data before it is rotated. This is because the MFP 1700 rotates each piece of image data after it is enlarged or reduced. As explained above, the MFP 1700 according to the third embodiment can further reduce the memory size used as the work area.

The explanation is made so far based on the case where the scaling processor 109 and the rotation processor 1701 are not directly connected to each other in terms of their circuit configuration. If the scaling processor 109 and the rotation processor 1701 are directly connected to each other in terms of their circuit configuration, then no area is required to temporarily store therein the enlarged or reduced image data even before the rotation process is performed. Thus, the memory size used as the work area can further be reduced.

In the MFP 1100 according to the second embodiment, as shown at steps S1508 and S1509 of FIG. 15, after it is determined that the required image data are ready, the rotation processor 1103 rotates a plurality of image data. On the other hand, the rotation processor 1701 according to the third embodiment rotates each piece of image data. As explained with reference to FIG. 9 according to the first embodiment, in the MFP 1700, a predetermined time interval is required in a period from the end of reading a document to the start of reading the next document due to the mechanism of the ADF. Therefore, in the MFP 1700, the image data for the read document can be rotated before the next document starts to be read. More specifically, the MFP 1700 according to the third embodiment does not collectively rotate a plurality of image data after the documents are read, unlike the MFP 1100 according to the second embodiment. Therefore, there occurs no delay due to the rotation process, which allows improvement of the processing speed.

The present invention is not limited by these embodiments, and various modifications as follows can be used.

Figure 18:
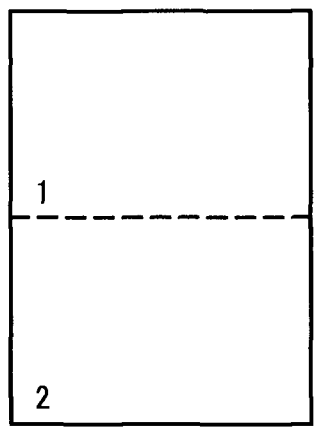
FIG. 18 is a schematic of an example of layout of image data upon combination in 2-in-1 mode.

Although the case where the MFP combines image data in the 4-in-1 mode is explained in the embodiments, image combination in any other mode can be used. As a modification, cases where MFP combines image data in 2-in-1 mode and 8-in-1 mode are explained below. FIG. 18 is a schematic of an example of layout of image data upon combination in the 2-in-1 mode. In this example, the MFP can perform the output process after image data for a first image is read and before a second image is input (namely, before the image data for the second image is written).

Figure 19:
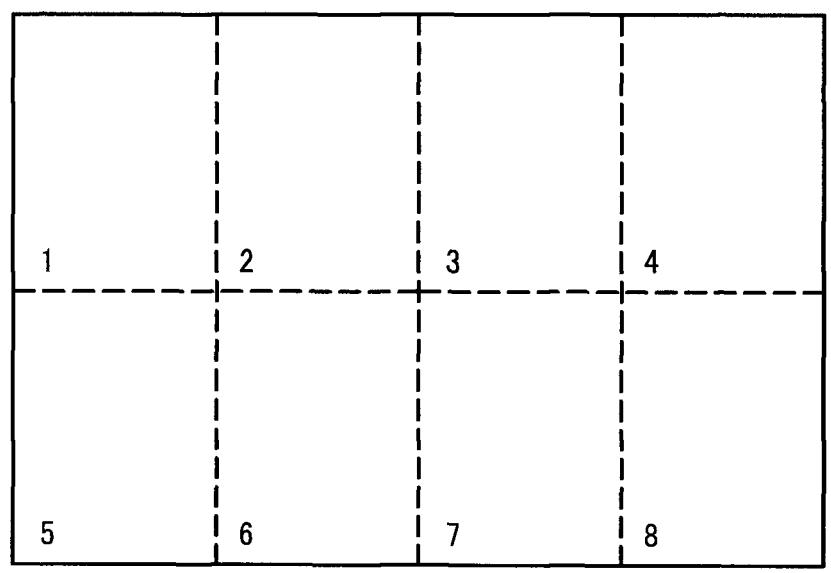
FIG. 19 is a schematic of an example of layout of image data upon combination in 8-in-1 mode.

FIG. 19 is a schematic of an example of layout of image data upon combination in the 8-in-1 mode. In this example, the MFP can perform the output process after image data for four images are read and before image data for a fifth image is input (namely, before the image data for the fifth image is written). The present invention is applicable to various methods of combination in the above manner.

Figure 20:
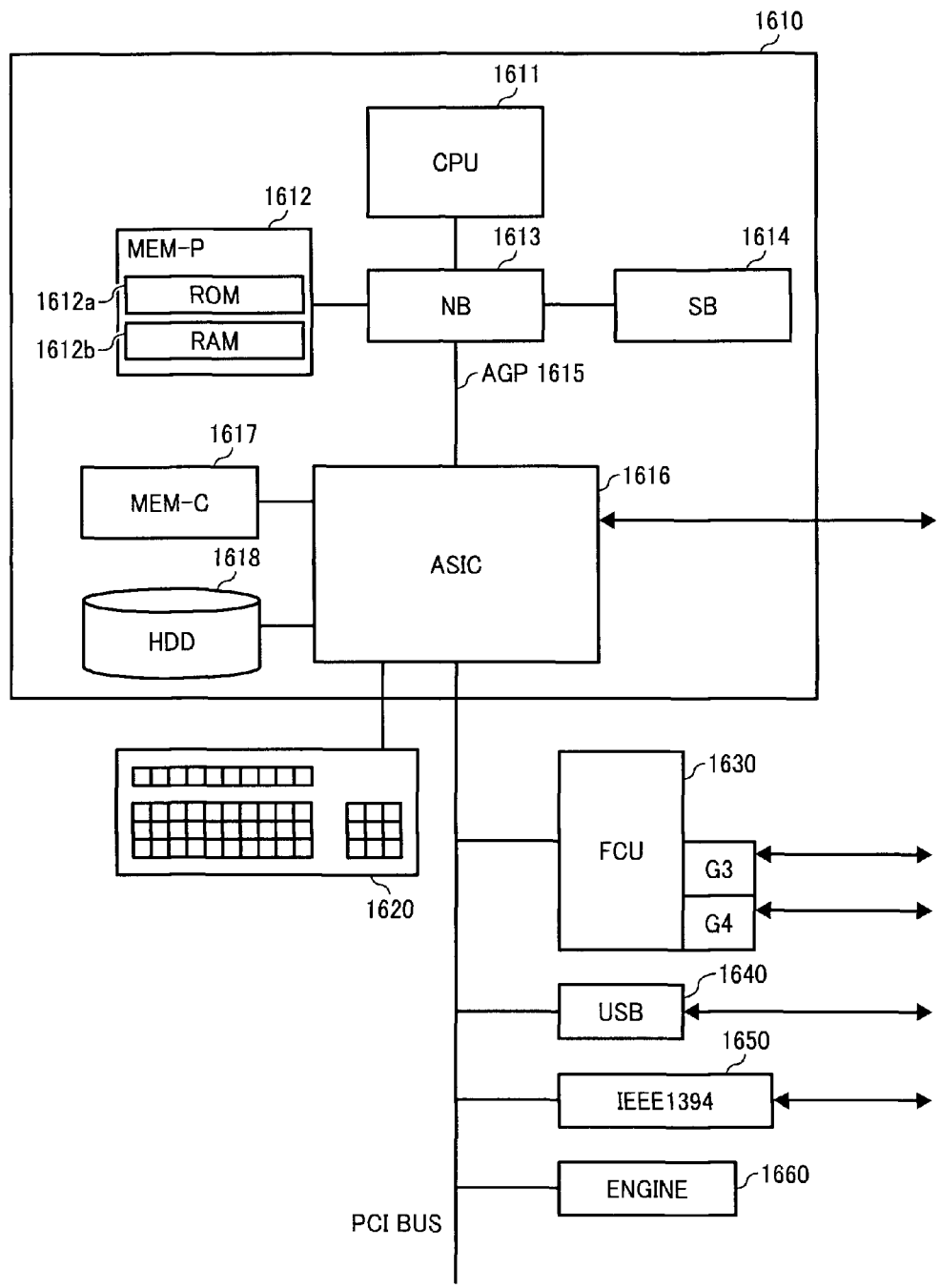
FIG. 20 is a block diagram of a hardware configuration of the MFP.

FIG. 20 is a block diagram of a hardware configuration of the MFPs according to the embodiments. Each of the MFPs includes a controller 1610 and an engine 1660 which are connected to each other via a peripheral component interconnect (PCI) bus. The controller 1610 controls the overall MFP and also controls the drawing, the communications, and the inputs through an operation unit 1620. The engine 1660 is a printer engine or the like which can be connected to the PCI bus, such as a monochrome plotter, a one-drum color plotter, a four-drum color plotter, a scanner, or a facsimile unit. The engine 1660 also includes image processing portions for error diffusion, gamma conversion, or the like, in addition to an engine portion such as the plotters.

The controller 1610 includes a central processing unit (CPU) 1611, a northbridge (NB) 1613, a system memory (MEM-P) 1612, a southbridge (SB) 1614, a local memory (MEM-C) 1617, an application specific integrated circuit (ASIC) 1616, and a hard disk drive (HDD) 1618. The NB 1613 and the ASIC 1616 are connected to each other through an accelerated graphics port (AGP) bus 1615. The MEM-P 1612 includes a read only memory (ROM) 1612a and a random access memory (RAM) 1612b.

The CPU 1611 controls the whole of the MFP, and has a chipset including the NB 1613, the MEM-P 1612, and the SB 1614. The CPU 1611 is connected to other devices via the chipset.

The NB 1613 is a bridge that connects the CPU 1611 to the MEM-P 1612, the SB 1614, and the AGP bus 1615. The NB 1613 includes a memory controller, a PCI master, and an AGP target. The memory controller controls read/write of data from/to the MEM-P 1612.

The MEM-P 1612 is a system memory used as a memory for storage of programs and data, a memory for expansion of the programs and the data, and a memory for drawing for a printer. The MEM-P 1612 includes the ROM 1612a and the RAM 1612b. The ROM 1612a is a read only memory used as the memory for storage of the programs and data, and the RAM 1612b is a rewritable and readable memory used as the memory for expansion of the programs and data and as the memory for drawing for a printer.

The SB 1614 is a bridge that connects the NB 1613 to a PCI device and peripheral devices. The SB 1614 is connected to the NB 1613 via the PCI bus. The PCI bus is also connected with a network interface (I/F) or the like.

The ASIC 1616 is an integrated circuit (IC) for image processing including a hardware element for image processing. The ASIC 1616 serves as a role of a bridge used to connect the AGP bus 1615, the PCI bus, the HDD 1618, and the MEM-C 1617 to each other. The ASIC 1616 includes a PCI target and an AGP master, an arbiter that forms a core of the ASIC 1616, a memory controller that controls the MEM-C 1617, a plurality of direct memory access controllers (DMACs) that rotate image data by a hardware logic, and a PCI unit that performs data transfer with the engine 1660 via the PCI bus. Connected to the ASIC 1616 are a facsimile control unit (FCU) 1630, a universal serial bus (USB) 1640, and the Institute of Electrical and Electronics Engineers (IEEE) 1394 interface 1650.

The MEM-C 1617 is a local memory used as an image buffer for copying and a code buffer, and the HDD 1618 is a storage that stores therein image data, programs, font data, and forms.

The AGP bus 1615 is a bus interface for graphics accelerator card that is proposed to increase the speed of graphic processing, and high-throughput direct access to the MEM-P 1612 allows the increase in the speed of the graphics accelerator card.

An image processing program executed in the MFPs according to the embodiments is provided by being preinstalled in the ROM and the like.

The image processing program executed in the MFPs may be provided by being recorded in a computer-readable recording medium such as a compact disk-read only memory (CD-ROM), a flexible disk (FD), compact disk-recordable (CD-R), and a digital versatile disk (DVD) in a file of an installable format or of an executable format.

Furthermore, the image processing program executed in the MFPs may be provided by being stored in a computer connected to a network such as the Internet and downloading the program via the network. The image processing program executed in the MFPs may also be provided or distributed via a network such as the Internet.

The image processing program executed in the MFPs is configured with modules including the components (input processor, layout specifying unit, scaling processor, reserving/releasing unit, writing unit, and output processor). As actual hardware, the CPU (processor) reads the image processing program from the ROM and executes it, and the components are thereby loaded on a main storage unit. Thus, the input processor, the layout specifying unit, the scaling processor, the reserving/releasing unit, the writing unit, and the output processor are generated on the main storage unit.

As described above, according to one aspect of the present invention, there is no need to store all the image data to be output in the work area. Thus, the memory size used as the work area can be reduced.

Furthermore, according to another aspect of the present invention, by enlarging or reducing image data in a period from the end of inputting the image data to an input of the next image data, the processing time required for the scaling process before the output process is performed can be reduced. Thus, the processing speed is improved.

Moreover, according to still another aspect of the present invention, by previously reserving the work area, any area other than the work area can be used for other processes. Thus, the memory area of the memory unit can be shared by a plurality of processes.

Furthermore, according to still another aspect of the present invention, an appropriate size can be reserved as the work area according to the number of image data. Thus, the size of the work area to be used can be reduced.

Moreover, according to still another aspect of the present invention, an appropriate size can be reserved as the work area according to each layout of image data. Thus, the size of the work area to be used can be reduced.

Furthermore, according to still another aspect of the present invention, even when image data is rotated, an appropriate memory size can be reserved as the work area. Thus, the memory size to be used as the work area can be reduced.

Moreover, according to still another aspect of the present invention, by rotating image data each time the image data is input, the area where the image data is stored before it is rotated can be reduced. Thus, the memory size to be used as the work area can be reduced.

Furthermore, according to still another aspect of the present invention, the output process can be started at an appropriate timing, and thus the time up to the output process can be reduced.

Moreover, according to still another aspect of the present invention, the size to be reserved as the work area can be decided according to the layout pattern correspondence information. Thus, by reserving the appropriate size of work area, the memory size to be used as the work area can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for processing image data, comprising:
a memory unit having a single work area for combining image data of plural images to be combined on an area of a recording medium;
a layout pattern correspondence management database configured to include (i) plurality of layout patterns indicating orders of the image data to be arranged on the area of the recording medium and (ii) respective memory sizes of a portion of the memory unit that is to be reserved as the single work area and that are needed to store image data of a first image to be arranged in a first area along a direction orthogonal to an image output direction of the recording medium, the plurality of layout patterns and the memory sizes being associated with each other, and the memory sizes corresponding to the layout patterns being less than a memory size needed to store all of the image data of the plural images;
a layout specifying unit configured to specify a layout pattern for arranging the image data in sequence to the area of the recording medium, the specified layout pattern being one of the plurality of layout patterns registered in the layout pattern correspondence management database;
a reserving unit configured to reserve as the single work area, a memory size corresponding to the specified layout pattern based on the layout pattern correspondence management database;
an image obtaining unit configured to obtain, in a sequence corresponding to, and same as, the arranging order of the specified layout pattern, the image data of the plural images to be combined on the area of the recording medium;
an input processor configured to perform input processing of the image data in the sequence that is the same as the arranging order of the specified layout pattern;
a writing unit configured to write sequentially the image data in the single work area that is reserved by the reserving unit based on the specified layout pattern;
a determining unit configured to determine whether or not a first image to be arranged in a first a along a direction orthogonal to an image output direction of the recording medium is stored in the single work area that is reserved by the reserving unit; and
an output processor configured to perform, in a case that the determining unit has determined that image data of the first image is stored in the single work area that is reserved by the reserving unit, output processing of the image data of the first image to the recording medium before the image obtaining unit obtains second image data of another of the plural images that is to be arranged in a second area next to the first area along the direction orthogonal to the image output direction,
wherein, after the output processing of the image data of the first image is finished and before the image obtaining unit obtains the second image data, the single work area that stores the image data of the first image is cleared for storing next the second image data to the single work area, or after the image obtaining unit obtains the second image data, the single work area is overwritten with the second image data.

2. The apparatus according to claim 1, further comprising:
a scaling processor configured to scale the image data during a period from a completion of the input processing of the image data until a completion of an input processing of next image data, and the output processor outputs scaled image data.

3. The apparatus according to claim 1, wherein the reserving unit reserves work areas of different sizes according to number of image data to be arranged in the direction orthogonal to the image output direction.

4. The apparatus according to claim 1, further comprising:
a rotation processor that performs rotation processing on the image data,
wherein the layout specifying unit specifies a layout of the image data on which the rotation processing is performed by the rotation processor.

5. The apparatus according to claim 4, wherein the writing unit writes the image data on which the rotation processing is performed by the rotation processor in the work area.

6. The apparatus according to claim 4, further comprising a timing storage unit that stores therein output start timing correspondence information in which a layout pattern indicating the order of the input image data to be arranged on the recording medium is associated with an output start timing indicating number of image data written in the work area with which the output processing is started, wherein
when the number of the image data indicated by the output start timing corresponding to the layout pattern that matches a layout of the image data set by a user is written in the work area, the determining unit determines that the image data are written in the work area.

7. The apparatus according to claim 1, further comprising a layout pattern storage unit that stores therein layout pattern correspondence information in which a layout pattern indicating the order of the input image data to be arranged on the area of the recording medium where the image data can be drawn is associated with a memory size to be reserved as the work area, wherein
the reserving unit reserves a memory size corresponding to the layout pattern that indicates the layout of the image data specified by the layout specifying unit as the work area.

8. A computer program product comprising computer-readable program codes embodied in a non-transitory computer-usable medium that when executed cause a computer to execute a method comprising:
(a1) specifying a layout pattern for arranging, in sequence, image data of plural images to be combined on an area of a recording medium, the specified layout pattern being amongst a plurality of layout patterns registered in a layout pattern correspondence management database that includes (i) a plurality of layout patterns indicating orders of the image data to be arranged on the area of the recording medium and (ii) respective memory sizes, corresponding to the layout patterns, of a portion of a memory unit that is to be reserved as a single work area for combining the image data of the plural images on the area of the recording medium and that are needed to store image data of a first image to be arranged in a first area along a direction orthogonal to an image output direction of the recording medium, the plurality of layout patterns and the memory sizes being associated with each other, and the memory sizes corresponding to the layout patterns being less than a memory size needed to store all of the image data of the plural images;

(a) obtaining, in a sequence corresponding to, and same as, the arranging order of the specified layout pattern, the image data of the plural images to be combined on the area of the recording medium;

(b) performing input processing of the image data in the sequence that is the same as the arranging order of the specified layout pattern;

(c) reserving, as the single work area, a memory size corresponding to the specified layout pattern based on the layout pattern correspondence management database;

(d) writing sequentially the image data in the single work area of the memory unit that is reserved in (c) based on the specified layout pattern;

(e) determining whether or not a first image to be arranged in a first area along a direction orthogonal to an image output direction of the recording medium is stored in the single work area that is reserved in (c); and (f) performing, in the case that it is determined in (e) that image data of the first image is stored in the single work area that is reserved in (c), output processing of the image data of the first image to the recording medium before second image data of another of the plural images that is to be arranged in a second area next to the first area along the direction orthogonal to the image output direction is obtained in (a), wherein, after the output processing of the image data of the first image is finished and before the second image data is obtained, the single work area that stores the image data of the first image is cleared for storing next the second image data to the single work area, or after the second image data is obtained, the single work area is overwritten with the second image data.

9. A method for an image processing apparatus to process image data, comprising:

(a1) specifying a layout pattern for arranging, in sequence, image data of plural images to be combined on an area of a recording medium, the specified layout pattern being amongst a plurality of layout patterns registered in a layout pattern correspondence management database that includes (i) a plurality of layout patterns indicating orders of the image data to be arranged on the area of the recording medium and (ii) respective memory sizes, corresponding to the layout patterns, of a portion of a memory unit that is to be reserved as a single work area for combining, the image data of the plural images on the area of the recording medium and that are needed to store image data of a first image to be arranged in a first area along a direction orthogonal to an image output direction of the recording medium the plurality of layout patterns and the memory sizes being associated with each other, and the memory sizes corresponding to the layout patterns being less than a memory size needed to store all of the image data of the plural images;

(a) obtaining, in a sequence corresponding to, and same as, the arranging order of the specified layout pattern, the image data of the plural images to be combined on the area of the recording medium;

(b) performing input processing of the image data in the sequence that is the same as the arranging order of the specified layout pattern;

(c) reserving, as the single work area, a memory size corresponding to the specified layout pattern based on the layout pattern correspondence management database;

(d) writing sequentially the image data in the single work area of the memory unit that is reserved in (c) based on the specified layout pattern;

(e) determining whether or not a first image to be arranged in a first area along a direction orthogonal to an image output direction of the recording medium is stored in the single work area that is reserved in (c); and (f) performing, in the case that it is determined in (e) that image data of the first image is stored in the single work area that is reserved in (c), output processing of the image data of the first image to the recording medium before second image data of another of the plural images that is to be arranged in a second area next to the first area along the direction orthogonal to the image output direction is obtained in (a), wherein, after the output processing of the image data of the first image is finished and before the second image data is obtained, the single work area that stores the image data of the first image is cleared for storing next the second image data to the single work area, or after the second image data is obtained, the single work area is overwritten with the second image data.

10. The method according to claim 9, further comprising:
scaling the image data to a size to be fitted in the area of the recording medium where the image data are combined; and outputting scaled image data, wherein the scaling of the image data occurs during a period from a completion of the input processing of the image data until a completion of an input processing of next image data.

11. The method according to claim 9 further comprising reserving work areas of different sizes according to number of image data to be arranged in the direction orthogonal to the image output direction.

12. The method according to claim 9 further comprising performing rotation processing on the image data; and
specifying a layout of the image data on which the rotation processing is performed.

13. The method according to claim 12, further comprising writing the image data on which the rotation processing is performed, in the work area.

14. The method according to claim 9 further comprising:
storing output start timing correspondence information in which a layout pattern indicating the order of the input image data to be arranged on the recording medium is associated with an output start timing indicating number of image data written in the work area with which the output processing is started, and when the number of the image data indicated by the output start timing corresponding to the layout pattern that matches a layout of the image data set by a user is written in the work area, determining that the image data are written in the work area.

15. The method according to claim 9 further comprising:
storing layout pattern correspondence information in which a layout pattern indicating the order of the input image data to be arranged on the area of the recording medium where the image data can be drawn is associated with a memory size to be reserved as the work area, and reserving a memory size corresponding to the layout pattern that indicates the specified layout of the image data as the work area.

16. The apparatus according to claim 1, wherein a total number of all of the plural images is greater than two.

17. The apparatus according to claim 1, wherein the layout specifying unit specifies the layout of the images in sequence along one of a first layout order that is orthogonal to the image output direction of the recording medium, a second layout order that is opposite to the first layout order, and a third layout order that is parallel to the image output direction.

18. The method according to claim 9, wherein the layout specifying unit specifies in (c) the layout of the images in sequence along one of a first layout order that is orthogonal to the image output direction of the recording medium, a second layout order that is opposite to the first layout order, and a third layout order that is parallel to the image output direction.

* * * * *